(12) United States Patent
Liu

(10) Patent No.: US 8,503,279 B2
(45) Date of Patent: Aug. 6, 2013

(54) SIX-DIMENSIONAL OPTICAL STORAGE METHOD AND APPARATUS

(71) Applicant: Shangqing Liu, Toronto (CA)

(72) Inventor: Shangqing Liu, Toronto (CA)

( * ) Notice: Subject to any disclaimer, the term of this patent is extended or adjusted under 35 U.S.C. 154(b) by 0 days.

(21) Appl. No.: 13/675,536

(22) Filed: Nov. 13, 2012

(65) Prior Publication Data

US 2013/0135980 A1     May 30, 2013

(51) Int. Cl.
    *G11B 7/00*     (2006.01)

(52) U.S. Cl.
    USPC ............ 369/109.01; 369/110.01; 369/110.02; 369/112.16

(58) Field of Classification Search
    None
    See application file for complete search history.

(56) References Cited

U.S. PATENT DOCUMENTS

| | | | | |
|---|---|---|---|---|
| 6,738,322 B2 * | 5/2004 | Amble et al. | ............... | 369/44.27 |
| 7,050,380 B2 * | 5/2006 | Hirai et al. | ............... | 369/112.17 |
| 7,848,209 B2 * | 12/2010 | Hirai | ........................ | 369/112.16 |
| 7,961,574 B2 * | 6/2011 | Nomoto | ........................ | 369/53.2 |

* cited by examiner

*Primary Examiner* — Muhammad N Edun

(57) ABSTRACT

The invention relates to a method of optical six-dimensional data storage and the apparatus based on it. This invention uses multiple beams with different wavelengths, encoded intensities and polarizations to create each group of multiple wavelength selective, reflectivity specified and polarization sensitive tiny plane or quasi-plane Bragg reflectors in a small volume crossing through multiple storage medium layers as each storage cell. The maximum storage capacity can over 10 Terabytes per disk with fast data write, read and erase speeds. In addition, the apparatus based on this method has no interlayer noise and disk rotation caused data recoding and reading quality loss, and has good compatibility with existing CD and DVD disks.

20 Claims, 5 Drawing Sheets

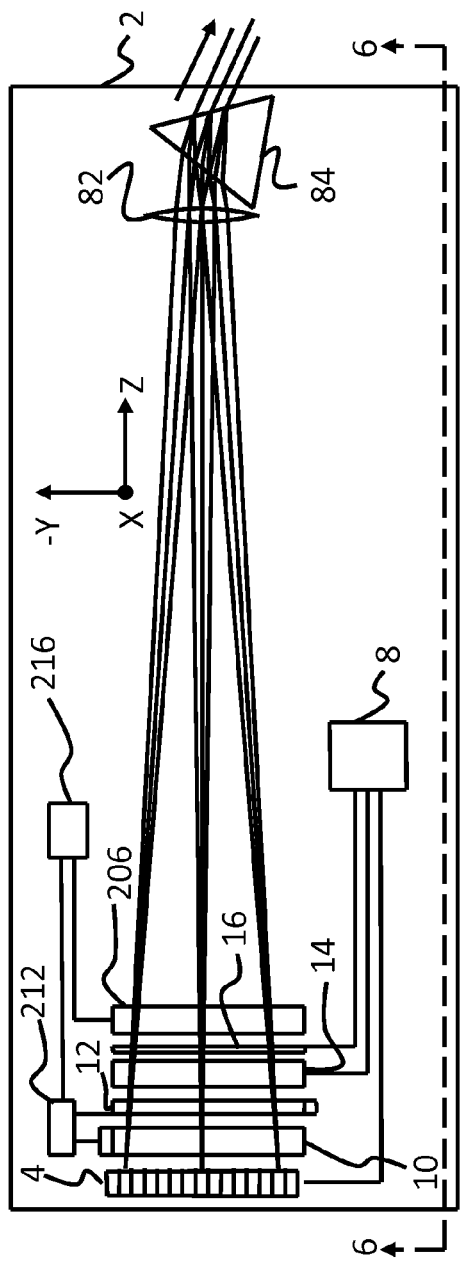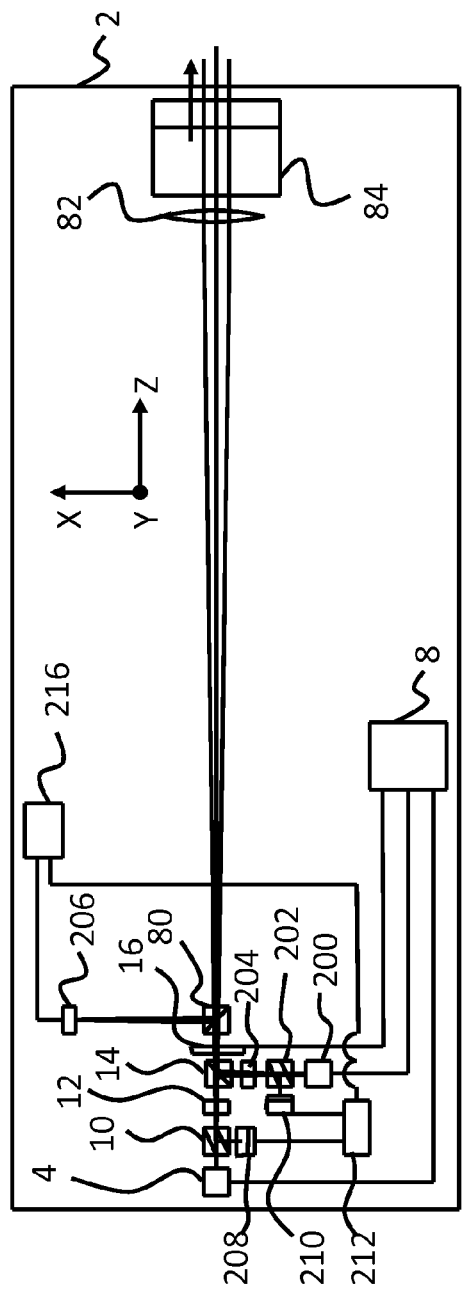

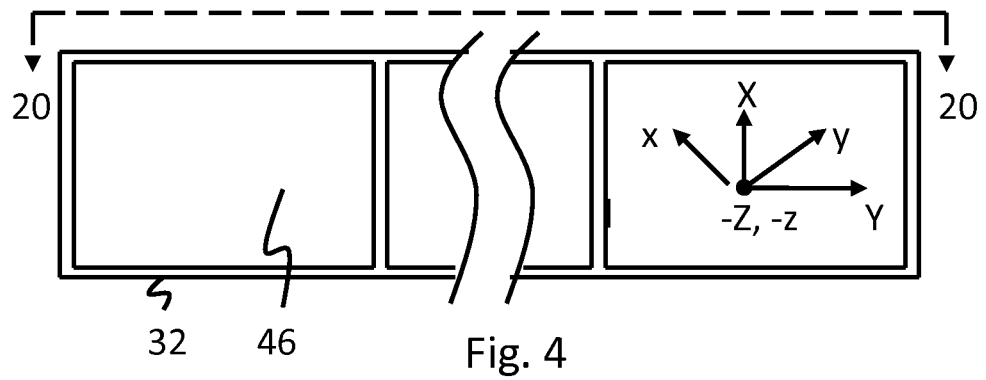
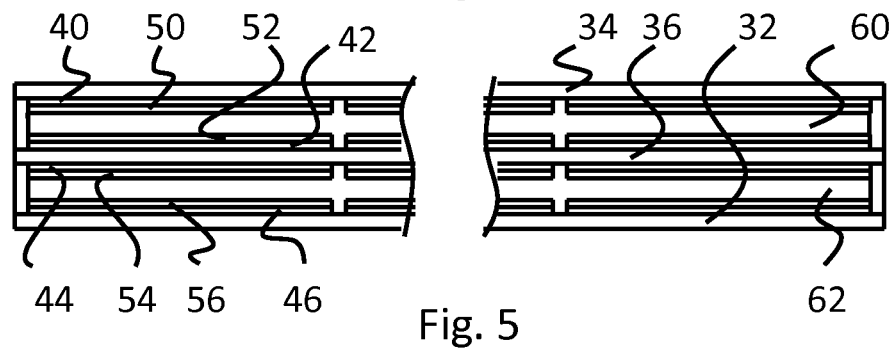
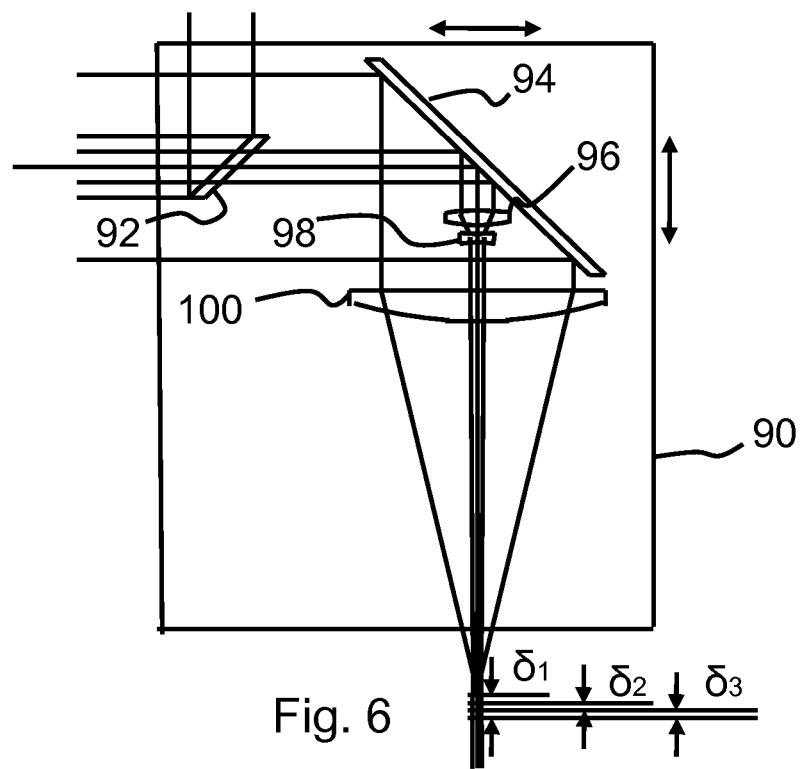

SIX-DIMENSIONAL OPTICAL STORAGE METHOD AND APPARATUS

FIELD OF THE INVENTION

The present invention relates to optical multi-dimensional data storage, and more particularly, to a method of optical six-dimensional data storage and the apparatus designed based on this method.

BACKGROUND OF THE INVENTION

With quickly growing of the data storage requirements, optical multi-dimensional storage has attracted great attention.

As opposed to the two-dimensional storage apparatuses like CD (compact disc), DVD (digital video disc or digital versatile disc) and Blu-ray drives, volumetric storage systems record data in three dimensions and increase the storage capacity. Multilayer and holographic data storages are two main proposed technologies for optical volumetric storage [see the reference: G. W. Burr, "Three-dimensional optical storage," Proceedings of SPIE, Vol. 5225, 20 Oct. 2003, San Diego, Calif., USA].

Normal multilayer data storage uses the disk containing many layers of data, each at a different depth in the medium. Since the laser must travel through other data layers before it reaches the desired layer, the laser interacts with every layer that it passes through on the way to and from the desired layer. These interactions cause noise that limits the available layer number. Holographic storage system stores data throughout the volume of the medium. In the holographic medium, the data are stored by intersecting the object beam, which contains the data, and the reference beam. However, the induced interference patterns consist of very fine fringes, any relative position change greater than a fraction of wavelength between the object or reference beam and the recording medium will cause the fringes to move, and blur holographic recording. Since the disk rotation rate is several thousand revolutions per minute, the fast disk rotation is a fundamental difficulty for creating an ideal hologram in the storage medium.

Apart from the three dimensions in space, the other "dimensions" in which the data can be stored have also been considered for increasing the storage capacity. Generally speaking, the more the "dimensions" are used, the more the data may be stored. Among the proposed four-dimensional storage technologies, one is using three spacial dimensions plus one wavelength dimension [see the reference: S. Kawata and Y. Kawata, "Three-dimensional optical data storage using photochromic materials," Chem. Rev., 100 (5), 2000, pp. 1777-1'788], and another is using three spacial dimensions plus one polarization dimension [see the reference: R. Hagen and T. Bieringer, "Photoaddressable polymers for optical data storage," Advanced Materials, Vol. 13, No. 23, 2001, pp. 1805-1810]. Among the proposed five-dimensional storage technologies, one is using three spacial dimensions plus one wavelength dimension and one polarization dimension [see P. Zijlstra, J. Chon and M. Gu, "Five-dimensional optical recording mediated by surface plasmons in gold nanorods," Nature 459, 2009, pp. 410-413], and another is using three spacial dimensions plus one wavelength dimension and one intensity dimension [see S. Liu, "Optical volumetric storage method and apparatus utilizing multiple tiny Bragg reflectors as storage cell," Canadian patent application, Application number: 2734440, Filing date: 10 Mar. 2011]. These four- or five-dimensional storages promised higher or at least equal storage capacities than or to the normal multilayer and holographic storages, that is, 1 to 10 TB per disk (TB: Terabytes, 1 TB=1000 GB=1000 Gigabytes), and faster data write, read and erase speeds. However, some of these technologies still utilize the normal multilayer or holographic structures, and so may have the interlayer noise and rotation blurring problems.

The optical storage has unique features, such as the removability of the storage medium, no write/read head crash due to wear, and the potential extreme high storage capacity. Therefore, the new and practicable high capacity optical storage technology is still expected. It is obvious that if the data can be stored in six-dimensions, that is, the three spacial dimensions plus an intensity dimension, a wavelength dimension and a polarization dimension (thus almost all of the physical "dimensions" of light are used), the storage capacity should increase further, and the data write, read and erase speeds should be faster. However, it is a challenge to design a system which can store the values of so many physical parameters in a tiny volume without interlayer noise and rotation blurring. In addition, such system should have a relatively simple structure, so that to get moderate size and reasonable price for becoming a popular commercial product. To my knowledge, no one has designed such optical storage system until now.

BRIEF SUMMARY OF THE INVENTION

The aim of this invention is to create a method for optical six-dimensional storage, and to design the apparatus based on this method. Its maximum storage capacity can reach 10 TB per disk or even more with fast data write, read and erase speeds. This method should have no interlayer noise and data recoding and reading quality losses as disk rotation. Furthermore, this method will have good compatibility with existing CD and DVD disks. Thus, the enormous amount of information stored in the existing CD and DVD disks may still be read and edited by the apparatus designed based on this method.

The said method of the invention comprises: using multiple linearly polarized light beams with different wavelengths, encoded intensities and encoded polarizations, which correspond to each group of data according to a color shade and polarization direction encoding regulation during each short period, to form each group of plane or quasi-plane standing waves in the photorefractive, polarization and wavelength sensitive optical medium; and through interactions between the formed standing waves and the medium to change medium refractive index to create each group of multiple wavelength selective, reflectivity specified and polarization sensitive tiny plane or quasi-plane Bragg reflector like structures in a small volume of the medium as each storage cell; and through wavelength sensitive character of the medium to locate the created Bragg reflector like structures in each storage cell in one layer storage medium or separately in multilayer storage medium; later by illuminating required storage cells using multiple unpolarized light beams to produce the groups of the reflected beams with selected wavelengths, correspondent intensities and particular polarizations; at last by decoding the groups of the reflected beams from the required storage cells through a color shade and polarization direction decoding process to reproduce the required stored data groups; in addition, may use traveling waves with required wavelengths during required periods to eliminate the created Bragg reflector like structures in one or multiple storage medium layer(s) of one or multiple storage cell(s) to erase the partial or total stored data, or may use standing wave(s) with required wavelength(s) during required period(s) to make one or multiple Bragg reflector like structure(s) have a specified reflectivity and polarization direction, which represents "no data", to erase the partial or total stored data. In the following, it will be indicated that the said Bragg reflector like structure is very similar to the Bragg reflector. In order to simplify the description, the said Bragg reflector like structure will be called as the Bragg reflector briefly thereafter.

The said multiple linearly polarized light beams are 2 to 90 or even more linearly polarized laser beams, their wavelengths are in the visible region, or extend into the ultraviolet or/and infrared region(s). The wavelengths, intensity levels and polarization directions of these multiple linearly polarized beams are encoded by each group of data according to a predetermined color shade and polarization direction encoding regulation during each short period to create each storage cell, that is, each composite state of the wavelengths, intensities and polarization directions of these multiple linearly polarized beams for creating each storage cell represents a data group. The color shade and polarization direction encoding regulation is that a certain part or the whole of every one of all possible composite states of the wavelengths, intensities and polarization directions of said multiple linearly polarized beams is defined in advance to correspond with one particular basic symbol of a suitable digital encoding scheme based on existing digital encoding knowledge (depending on symbol length and the number of possible composite states, and the symbol length may be shortened to reduce the number of total required basic symbols if needed when choosing or designing the encoding scheme), and every one of the required basic symbols may be represented by a certain part or the whole of a correspondent composite state, thus, as any data group with limited data amount can be expressed by one basic symbol or a basic symbol group, any data group, which data amount is adequate and within the limiting range, can be represented by a composite state of the wavelengths, intensities and polarization directions of said multiple linearly polarized beams by proper combination and arrangement of the correspondent basic symbols. By placing a reflective mirror under the outgoing beams from the storage medium to reflect the said multiple linearly polarized beams perpendicularly back into the storage medium to interfere with the subsequently incident beams, the Bragg reflectors are created. Because a created Bragg reflector only reflects the beam which wavelength is same as its write beam, and the reflective intensity is proportional to its write beam intensity, when each group of the Bragg reflectors is illuminated by multiple unpolarized laser beams later, every Bragg reflector in the group will selectively reflect the beam with matched wavelength and with correspondent intensity. Furthermore, due to storage medium character the created Bragg reflectors are polarization sensitive, that is, the maximum intensity of the beam reflected from a Bragg reflector appears when the reflected beam polarization direction is same as that of the beam wrote that Bragg reflector. By measuring the intensities of different directions, the polarization direction of each reflected beam, and subsequently the polarization direction of each write beam may be known later. Thus, the composite state of the wavelengths, intensities and polarization directions of each write beam group may be reproduced. Then, through a color shade and polarization direction decoding process which reverses the previous color shade and polarization direction encoding process, each group of stored data can be read out. In this way, every group of the data may be written and read by creating and illuminating its correspondent group of the Bragg reflectors with the said encoding and decoding procedures.

Speaking in detail, the said method of the invention is realized through setting up optical shaping, collimating, converging, diverging, reflecting, dispersing, collecting, intensity modulating, polarization direction rotating, cut-off filtering, polarizing beam splitting, automatic focusing, automatic tracking and optical detecting paths, combining with electronic encoding and decoding circuits. The multiple linearly polarized laser beams with different wavelengths are divided into one or multiple sub-group(s), and the wavelengths of each beam sub-group are within a particular range. The beams in each sub-group are guided to become collinear, concentric and parallel or quasi-parallel beams with available smallest beam diameters at a particular depth. The intensities and polarization directions of the linearly polarized beams in all sub-groups are modulated and rotated to make their composite state correspond with each group of data during each short period according to the said color shade and polarization direction encoding regulation. These beams perpendicularly illuminate the rotating disk containing one layer or multilayer (2 to 90 or even more) storage medium, and the smallest diameters of each beam sub-group are within a correspondent storage layer. These storage layers are made of photorefractive, polarization and wavelength sensitive optical medium, and the different storage layers are sensitive to different wavelength ranges. The said optical storage medium includes photoaddressable polymers [see the reference: R. Hagen and T. Bieringer, "Photoaddressable polymers for optical data storage," Advanced Materials, Vol. 13, No. 23, 2001, pp. 1805-1810], polarized holographic recording photopolymers [see the reference: L. Dhar, and et cetera, "Photopolymer medium for digital holographic data storage," SPIE, Vol. 3401, 1998, pp. 217-220], metallic nanorods [see the reference: P. Zijlstra, J. Chon and M. Gu, "Five-dimensional optical recording mediated by surface plasmons in gold nanorods," Nature 459, 2009, pp. 410-413], semiconductor nanocrystal quantum dots [see the reference: Li, J. Chon, Evans, and M. Gu, Opt. Express, 2009], and so on. These examples are not the only optical storage mediums for the invented method. The said optical storage medium should include all of the photorefractive, polarization and wavelength sensitive materials, that is, the materials which optical refractive index may be changed by light with the intensity of over the change threshold of medium refractive index, and these material refractive indexes change also with light polarization direction and wavelength or with polarization direction simultaneously and obviously. These materials include the existing mature ones and the developing ones for getting better performance in the future. The reflective mirror is moved or switched on under the beams outgoing from storage medium to reflect the illuminating beams perpendicularly back into the storage medium in data writing status. The minimum intensities of the write beams are modulated to be higher than the change threshold of the storage medium refractive index, so the multiple plane or quasi-plane standing waves are formed in one layer storage medium or in multilayer storage medium along the illumination beam common axis. Each group of tiny plane or quasi-plane Bragg reflectors containing the correspondent data group is created in a tiny volume which crosses through one or multiple storage layer(s) during each short period, and the Bragg reflectors created by the beams with different wavelengths are in one storage layer or separately in multiple storage layers according to their wavelengths. In the same way, the different groups of data are written at the different positions of the layer plane with storage layer(s) rotation and beam spots movements along the radial direction of the storage layer rotation.

Later, the multiple "unpolarized" beams, each of them consists of two orthogonal linearly polarized beams, are used for reading data. The multiple "unpolarized" beams have the same wavelengths as the said multiple linearly polarized beams. The "unpolarized" beam intensities are reduced below the change threshold of the storage medium refractive index. The intensities of the "unpolarized" beams are modulated to be same and the reflective mirror is removed from or switched off under the beams outgoing from the storage medium. Thus, the read beams can only be reflected by the Bragg reflectors. The reflected intensity depends on the Bragg reflector reflectivity and Bragg reflector polarization sensitivity. The reflected beam polarization direction may be measured by differential detection element which analyzes the value of differential signal produced by the intensities of two orthogonal polarization components of the reflected beams with same wavelength. At last, by decoding the detected composite state of the wavelengths, intensities and polarization directions of the reflected beams from each storage cell, each group of the stored data is read out.

There are two ways may be used to erase the stored data, in both cases, the same multiple linearly polarized light beams for write are used as the erase beams. One is using the traveling waves: the intensities of the beams with required wavelengths are raised over the change threshold of the storage medium refractive index. The polarization directions of these beams are rotated to be same or become circularly rotating. The reflective mirror under the beams outgoing from the storage medium is removed or switched off, so these erase beams become the travelling waves when they illuminate the storage layer(s). These high intensity travelling waves will eliminate the created Bragg reflectors by the interactions between the light and the medium. By choosing beams with required wavelengths and illuminating the storage layers during required periods, the created Bragg reflectors in one or multiple storage medium layer(s) of one or multiple storage cell(s) can be eliminated, and so to erase the partial or total stored data. Another is using the standing waves: the intensity(ies) of the beam(s) with required wavelength(s) is/are raised over the change threshold of the storage medium refractive index too. The reflective mirror is moved or switched on under the beams outgoing from the storage medium. The intensity(ies) and polarization direction(s) of this/these beam(s) are modulated and rotated to a same specified level and a same specified direction no matter what wavelength of the beam is. The Bragg reflectors created by the beams with this specified reflectivity level and polarization direction and with any wavelength are all predetermined to represent "no data" in said color shade and polarization direction encoding and decoding regulations. By choosing beam(s) with required wavelength(s) and illuminating the storage layers during required period(s), one or multiple Bragg reflector(s) is/are rewritten to "no data" state, and so the partial or total stored data are erased.

In each storage cell, the storage amount depends on the available composite state number of the wavelengths, intensities and polarization directions of the write beams. If the wavelength number is W, the intensity level number is I and the polarization direction number is P, the available composite state number C is given by $C=(IP)^W$ (see the explanation underneath). Therefore, the number C can be very large even the numbers W, I and P are moderate. If there are multiple storage layers and each storage layer is thick enough, a lot of Bragg reflectors may be stored in one storage cell. In addition, when each layer is thick enough, the reflectivities of the Bragg reflectors in it are high because every reflector may consist of many reflective layers. Thus, the dynamic range of the reflector reflectivity is wide, which can offer more identifiable intensity levels. By using the medium with large anisotropy, and since the differential detection has fine discrimination, the identifiable polarization direction number may be high too. Therefore, the available composite state number may be large, which results in a large amount of data may be stored in each storage cell. Since every storage cell has a tiny volume, the storage capacity of the whole disk will be huge. In this method, the data are transformed by multiple beams and in the six dimensions at the same time, so the data transform speed is very fast. Furthermore, this method writes and reads the data to and from every storage cell through volumetric manner, and each storage layer only responds to one wavelength range, so it has no interlayer noise. At last, because the formed standing waves are plane or quasi-plane, and so the refractive layers of the created Bragg reflectors are parallel or almost parallel with the storage layer plane, the storage layer rotation has no or very less influence on the creating and detecting the Bragg reflectors. Thus, the data record and reproduction qualities have no or very small loss due to disk rotation.

BRIEF DESCRIPTION OF THE DRAWINGS

The preferred embodiments of the apparatus designed for realizing said method will be described underneath. Obviously, these embodiments are not the all apparatuses which can be designed based on the said method. Basing on key idea of the invented method and using existing optical knowledge, the said method and the apparatus embodiments may be modified and alternated. Therefore, the applicant of this invention reserves the rights of all modifications, alternatives, and equivalent arrangements of the invented method and the apparatus embodiments described underneath.

The aforementioned aspects and advantages of the invention will be appreciated from the following descriptions of preferred embodiments and accompanying drawings wherein:

FIG. 2 illustrates the schematic optical structure of the laser source and detection system located in the block 2 in FIG. 1.

FIG. 3 is a schematic bottom side view taken on the dash line 6-6 in FIG. 2.

FIG. 4 illustrates the schematic optical structure of the polarization rotator array 16 FIG. 2.

FIG. 5 is a schematic top side view taken on the dash line 20-20 in FIG. 4.

FIG. 6 illustrates the schematic optical structure of the first preferred embodiment of the actuator 90 in FIG. 1.

DETAILED DESCRIPTION OF THE INVENTION

An optical storage apparatus designed based on the invented method is described underneath, which comprises of: one layer or multilayer photorefractive, polarization and wavelength sensitive optical storage medium with data stored in concentrically circular or spiral tracks; lasers generating multiple linearly polarized or unpolarized beams with different wavelengths, these multiple linearly polarized or unpolarized beams are arranged to be collinear, concentric and parallel or quasi-parallel with available smallest diameters to write data to, read data from and erase data in the said storage cells; one or multiple light intensity modulator(s), one or multiple polarization direction rotator(s) and one electronic processor to encode the composite state of wavelengths, intensities and polarization directions of said multiple linearly polarized beams during each short period to correspond to each group of data according to said color shade and polarization direction encoding regulation; an optical means for making the available smallest diameters of said multiple linearly polarized or unpolarized beams at one or different depth(s) according to their wavelengths; multiple optical detectors for measuring the intensities and polarization directions of the beams reflected from each required said storage cell, and an electronic processor for decoding the composite state of wavelengths, intensities and polarization directions of the beams reflected from each required said storage cell during each required short period to reproduce each required group of data according to said color shade and polarization direction decoding regulation; an optical means for fast moving or switching on a reflective mirror under the beams outgoing from said one layer or multilayer optical storage medium when writing the data or erasing the data using the standing waves, and removing or switching off that mirror when reading the data or erasing the data using the traveling waves; an optical means for automatic making the available smallest diameters of said multiple linearly polarized or unpolarized beams fall in the required layer(s) of the one layer or multilayer optical storage medium according to their wavelengths; an optical means for automatic tracking to center the multiple linearly polarized or unpolarized light beam spots on said circular or spiral tracks; in addition, an optical means may be used if needed for correcting reflectivity distortions of the Bragg reflectors in different storage cells in the disk; an optical means may be used if needed for correcting reflectivity ununiformity of the Bragg reflectors created by the beams with different wavelengths in one or different disks; an optical means may be used if needed for making the apparatus to be compatible with the CD and DVD disks.

Figure 1:
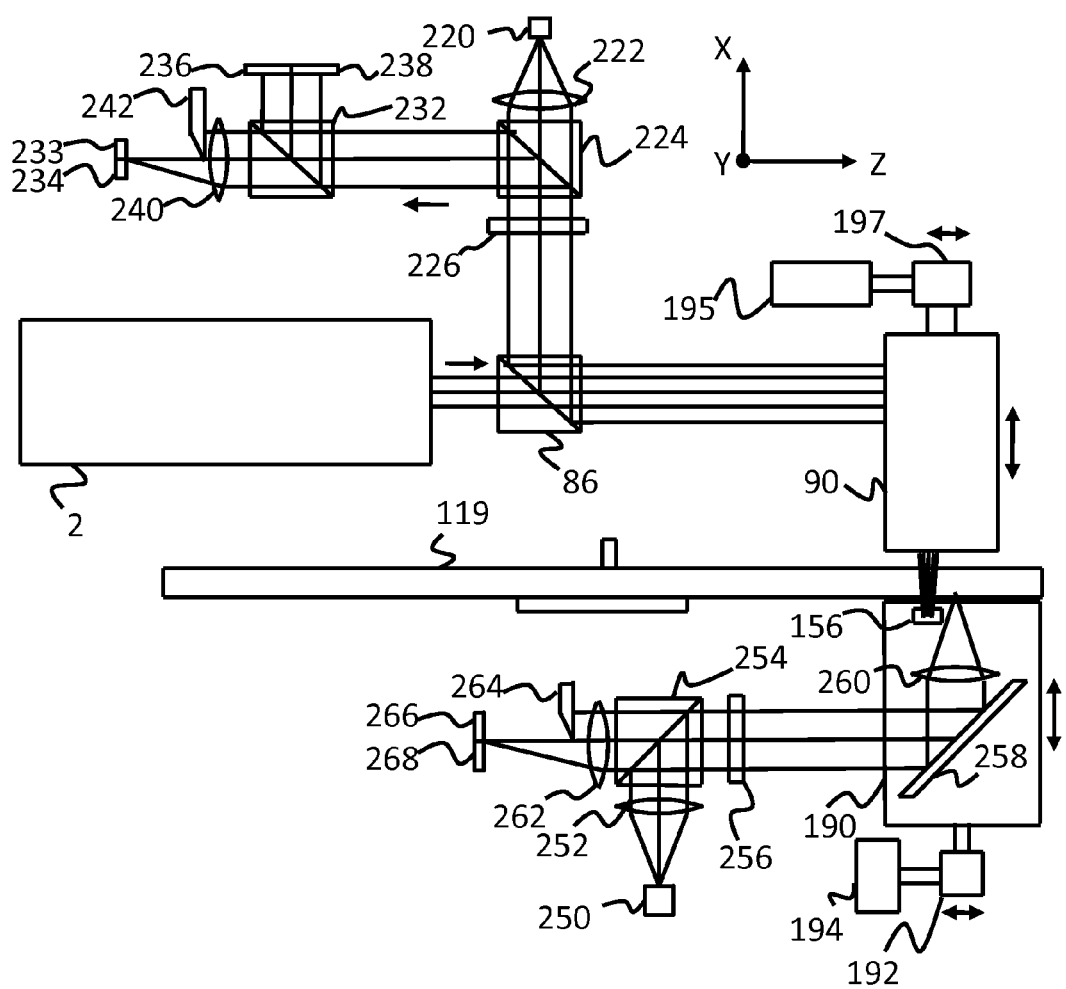
FIG. 1 illustrates the schematic optical structure of the storage apparatus with the disk as the first preferred embodiment of the apparatus according to the invention.

FIG. 1 illustrates the schematic optical structure of the apparatus as the first preferred embodiment of the apparatus according to the invention (because the sizes of various parts differ largely, in order to show necessary details, the shown structure is not drawn in practical ratio). The block 2 is the laser source and detection system section which structure is shown in FIG. 2. In FIG. 2, the laser array 4 consists of multiple (2 to 90 or even more) semiconductor lasers which are arranged in a line according to their wavelength order. In order to show the structure clearly, only three beams are drawn. As the semiconductor laser can be as small as 300 μm×50 μm×10 μm [see the reference: M. Bass, and et cetera, eds., Handbook of Optics, Vol. I, McGraw-Hill, 1995, p. 31.7], such a laser array can have an acceptable size. The beams from the laser array 4 are linearly polarized light, and their polarization directions are oriented at 45° relative to the X axis in XY plane. FIG. 3 is a schematic bottom side view taken on the dash line 6-6 in FIG. 2. In order to reduce the size and cost, these lasers may be integrated into one or several semiconductor substrate(s). If the laser beams have aberrations, the measures may be adopted to correct the defects. In addition, these laser beam frequencies may be stabilized to reduce wavelength shifts. For example, the laser array may be mounted on a good heat-sink or using closed-loop feedbacks, and so on. Since there are mature technologies for these corrections and improvements, the detailed discussions are neglected and the involved optical elements are not drawn in FIGS. 2 and 3. These beam intensities are modulated by the electronic controllers located in the processor 8 by the electrical modulations on lasers directly. After passing a polarizing beam splitter 10, which one optical axis is at 45° relative to the X axis, these beams go through an optical isolator array 12, and their polarization directions are rotated −45° becoming parallel with the X axis. 14 is a polarizing beam splitter too, which let the beams with polarization directions parallel with the X axis pass straight. Then, these passing beams go to a polarization rotator array 16, which rotates these beam polarization directions by the controlling of the processor 8 too.

The optical isolators are used to prevent unwanted feedbacks into the laser array 4 again. These feedbacks may cause noises including power fluctuations and frequency shifts. The optical isolator works on Faraday Effect [see the reference: M. Bass, and et cetera, eds., Handbook of Optics, Vol. IV, McGraw-Hill, 2001, p. 10.9]. Here, as the beam wavelengths are different, the isolators in the array 12 must have different lengths or need different magnetic fields to produce same −45° rotations. Considering the size and cost of Faraday isolators, and the semiconductor laser noise may be reduced effectively by high-frequency modulation of injection current [see the reference: M. Bass, and et cetera, eds., Handbook of Optics, Vol. I, McGraw-Hill, 1995, pp 0.31.8-31.13], the isolator array 12 may be removed if required. The injection current modulation of the semiconductor laser can be very fast with pulse duration of a few nanoseconds. As the data write and erase are in the pulsing manner, and the data read may be in the pulsing manner too if the pulsing rate is high, the lasers in the array 4 can work with high-frequency modulation of injection current (perhaps, the all lasers in the array 4 need working synchronously). If the array 12 is removed, the polarization directions of the beams from the array 4 should be parallel with the X axis at the beginning. The optical isolators don't need adjustments, so they are independent with the processor 8 electrically.

FIG. 4 is the schematic optical structure of the polarization rotator array 16. FIG. 5 is a schematic top side view taken on the dash line 20-20 in FIG. 4. In FIGS. 4 and 5, 32, 34 and 36 are three thin glass sheets. The inside surfaces of the sheets 32, 34, and the both side surfaces of the sheet 36 are coated with separated transparent electrode layers, such as the layers 40, 42, 44 and 46. These electrode layers are covered by alignment layers, such as the layers 50, 52, 54 and 56. The nematic liquid crystal molecules are filled between the glass sheets as the liquid crystal layers 60 and 62. Thus, multiple liquid crystal sub-cells are formed in a line as an array. The electrical voltage is applied to each liquid crystal sub-cell to change the directions of the liquid crystal directors, that is, to change the birefringence of each liquid crystal sub-cell. Thus, every liquid crystal sub-cell becomes a tunable optical retarder. As the glass sheets 32 and 34 are entering and outgoing windows for beams from the laser array 4, so each liquid crystal sub-cell contains partial window 32 or window 34 acts as the "input" or "output" retarder. In the polarization rotator array, each polarization rotator consists of an "input" retarder and an "output" retarder. Choosing aligning directions of the alignment layers 50, 52, 54 and 56, the fast optical axes of the "input" and "output" retarders are made along the x axis and along the X axis. The "input" retarders will have tunable retardations to determine polarization rotations, while the "output" retarders will act as variable quarter-wave plates. By changing the voltages applied on each pair of "input" and "output" retarders, the polarization direction of the linearly polarized beam can be rotated to a desired angle [One may see the reference: O. Aharon and I. Abdulhalim, "Liquid crystal wavelength-independent continuous polarization rotator," Optical Engineering, Vol. 49(3), 2010, pp. 034002.1-034002.4]. The liquid crystal retarder working speed is usually around a millisecond under the voltage of several Volts. By increasing the voltage applied to the liquid crystal sub-cells, the rotation speed may reach a few microseconds. Because multiple rotators can be made by coating separated electrodes on three glass sheets, the liquid crystal polarization rotator array has small volume and low cost, and it is wavelength independent.

In order to increase the rotation speed, the solid Pockels or Kerr electro-optic crystals, which response time can reach a nanosecond, can be used to replace the liquid crystals [see the reference: M. Bass, and et cetera, eds., Handbook of Optics, Vol. II, McGraw-Hill, 1995, pp. 13.6-13.10]. By coating two electrode layers on two side surfaces of each electro-optic crystal and applying voltages on the electrodes, each electro-optic crystal becomes a tunable optical retarder too. Combining every two of such retarders and arranging their induced fast optical axes with an inclination of 45°, thus, multiple polarization rotators can be built in the same way as that of the liquid crystal ones. The electric field may also be applied along the beam traveling direction. The rotators made of electro-optic crystals have high speed and light power capability. However, these rotators are wavelength dependent and their volumes are relatively large.

In FIG. 3, 80 is a nonpolarizing and non-color-selective beam splitter with a fixed intensity reflectivity, such as 10% to 40%, so the most light of the beams with encoded intensities and polarization directions can pass this splitter. The nonpolarizing beam splitter introduces no polarization effects to the splitting beams. Then, these beams are converged by a lens 82 and collected by a dispersive prism 84 to become parallel, collinear and concentric beams. In FIG. 1, 86 is a nonpolarizing and color-selective beam splitter, which consists of two right angle prisms with a cut-off filter or a narrowband reflector located on the diagonal interface. The cut-off filter transmits all the beams with the wavelengths below, and reflects those above a certain wavelength, or vice versa. The narrowband reflector reflects the beam which wavelength is in the narrowband and transmits those out of the narrowband [see the reference: M. Bass, and et cetera, eds., Handbook of Optics, Vol. I, McGraw-Hill, 1995, pp. 42.45-42.46, p. 42.54 and pp. 42.63-42.66]. Making the wavelengths of the beams from the laser array 4 within the transmission range of the cut-off filter, or without the narrowband of the narrowband reflector, thus all of these beams can pass the splitter 86. Then, these beams enter into an actuator 90, which structure is shown in FIG. 6.

FIG. 6 illustrates the schematic optical structure of the first preferred embodiment of the actuator 90 in FIG. 1. In FIG. 6, 92 is a nonpolarizing and color-selective reflector, which transmit the beams from the laser array 4. These beams are then reflected by a nonpolarizing reflective mirror 94, and enter a convergent lens 96 and a divergent lens 98 to become collinear, concentric and focused or quasi-parallel beams with available smallest beam diameters and enough long depths of focus. The depth of focus is the distance away from the focal plane over which the tight focus can be maintained (it will be explained further underneath). The convergent and divergent lenses 96 and 98, or one of them, are made of axial chromatic aberration material, and their optical axes and that of the convergent lens 100 are collinear and concentric. The axial chromatic aberration lens can focus the beams with different wavelengths at different depths [see the reference: M. Bass, and et cetera, eds., Handbook of Optics, Vol. II, McGraw-Hill, 1995, pp. 1.23-1.28]. By choosing proper axial chromatic aberration material, and dividing the wavelengths of the beams from the laser array 4 into multiple different wavelength ranges, these beams may be focused at the different depths, and so their smallest beam diameters may be within the different storage layers. In order to get better performance, the convergent and divergent lenses 96 and 98, or one of them, may be special designed, such as using several layers of different axial chromatic aberration materials, to make the beams which wavelengths are within a same wavelength range focus at an approximately same depth. Using axial chromatic aberration lens may simplify the actuator structure, size and weight. In this embodiment, the beams from the laser array 4 are divided into three sub-groups 1, 2 and 3, which have three different wavelength ranges of $\delta\lambda_1$, $\delta\lambda_2$ and $\delta\lambda_3$. Then, the beam sub-groups 1, 2 and 3 illuminate the storage medium layers, that is, the optical disk 119 perpendicularly (see FIG. 1). In FIG. 6, $\delta_1$, $\delta_2$ and $\delta_3$ are the ranges in which the smallest diameters of the beams in sub-group 1, 2 and 3 are approximately maintained. $\delta_1$, $\delta_2$ and $\delta_3$ will be located at different depths in the optical disk 119. In order to avoid affecting the focusing of the beam sub-groups 1, 2 and 3, the round central area of the lens 100 has plane surfaces on both sides. The diameter of this round central area is small which just let the three sub-group beams pass. A small round hole may also be drilled at the center of the lens 100, which diameter just let the three sub-group beams pass.

Figure 7:
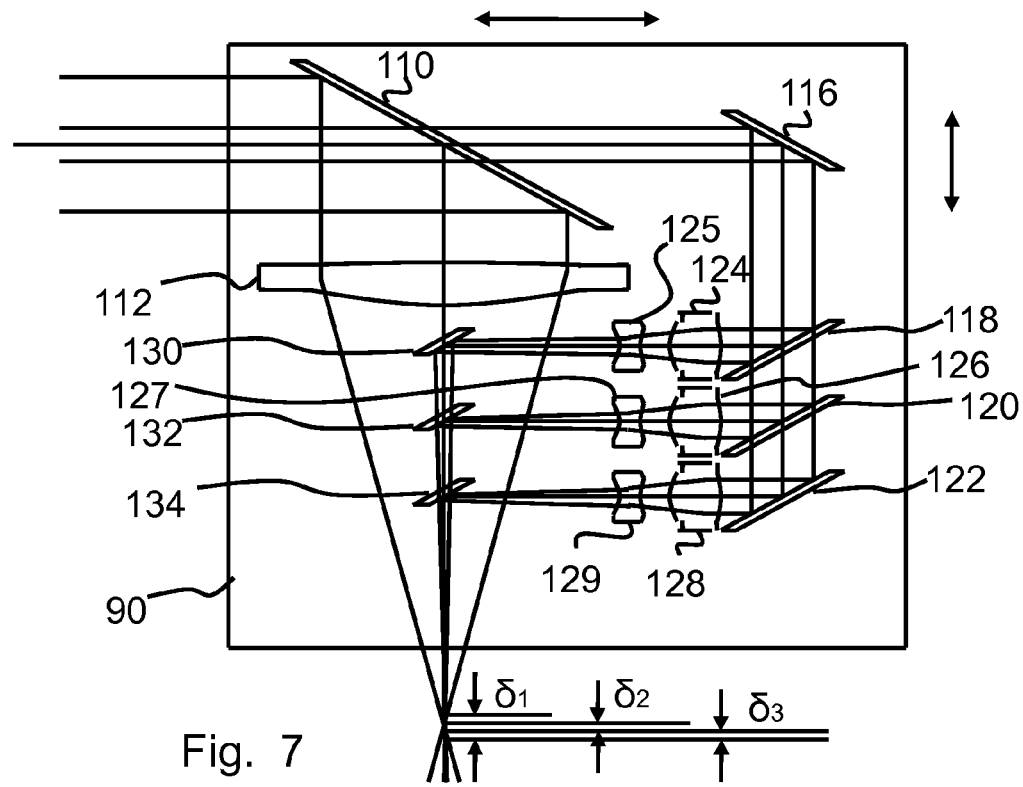
FIG. 7 illustrates the schematic optical structure of the second preferred embodiment of the actuator 90 in FIG. 1.

The actuator structure may be changed or modified basing on the existing optical knowledge. FIG. 7 illustrates the schematic optical structure of the second preferred embodiment of the actuator 90 in FIG. 1. In FIG. 7, 110 is a nonpolarizing and color-selective reflector, which transmit the beams from the laser array 4. The beams from the laser array 4 are then reflected by a nonpolarizing reflective mirror 116, and enter a group of nonpolarizing cut-off reflectors. In this embodiment, the group of nonpolarizing cut-off reflectors contains three ones, that is, the reflectors 118, 120 and 122, and they have three different transmission wavelength ranges of $\Delta\lambda_1$, $\Delta\lambda_2$ and $\Delta\lambda_3$. The beams from the laser array 4 are also divided into three beam sub-group 1, 2 and 3 with wavelength ranges $\delta\lambda_1$, $\delta\lambda_2$ and $\delta\lambda_3$. By arranging $\delta\lambda_2$ and $\delta\lambda_3$ within and $\delta\lambda_1$ without $\Delta\lambda_1$, $\delta\lambda_3$ within and $\delta\lambda_2$ without $\Delta\lambda_2$, and $\delta\lambda_3$ without $\Delta\lambda_3$, the beam sub-groups 1, 2 and 3 are separately reflected by the reflectors 118, 120 and 122. Afterwards, the beam sub-group 1, 2 and 3 are converged by three lenses 124, 126 and 128, and are diverged by three lenses 125, 127 and 129 to become focused or quasi-parallel beams with available smallest beam diameters. Then, they are wavelength selectively reflected by three nonpolarizing cut-off reflectors 130, 132 and 134. The transmission wavelength ranges of the reflectors 130, 132 and 134 are $\Delta\lambda'_1$, $\Delta\lambda'_2$ and $\Delta\lambda'_3$. $\delta\lambda_1$ is without $\Delta\lambda'_1$. $\delta\lambda_1$ is within and $\delta\lambda_2$ is without $\Delta\lambda'_2$. $\delta\lambda_1$ and $\delta\lambda_2$ are within and $\delta\lambda_3$ is without $\Delta\lambda'_3$. Then, the beam sub-groups 1, 2 and 3 illuminate the storage disk 119 perpendicularly (see FIG. 1). In FIG. 7, $\delta_1$, $\delta_2$ and $\delta_3$ are the ranges in which the smallest diameters of the beams in sub-group 1, 2 and 3 are maintained. In other words, they are the depths of focus of the lens pairs of 124 and 125, 126 and 127, 128 and 129, respectively. In general, the beams from the laser array 4 may be divided into multiple (2 to 90 or even more) sub-groups depending on the number and properties of the storage layers in the disk, such as the interference fringe resolution of the storage layers, the available smallest lengths of the storage cells, and so on. For each of such multiple beam sub-groups, two nonpolarizing cut-off reflectors, one convergent lens and one divergent lens are used and arranged in the similar ways like those shown in FIG. 7 to make each beam sub-group illuminate on the disk with their smallest beam diameters located within each correspondent storage layer.

The actuator structure shown in FIG. 7 or the one designed for different multiple beam sub-groups may be changed or modified further. For example, when the write beams have three sub-groups, one may use three paraboloid reflectors, which have the same nonpolarizing cut-off properties as the plane reflectors 118, 120, 122, respectively, to replace the reflectors 118, 120, 122. In that case, the convergent and divergent lenses 124, 125, 126, 127, 128, and 129 may be removed to reduce the actuator weight.

Figure 8:
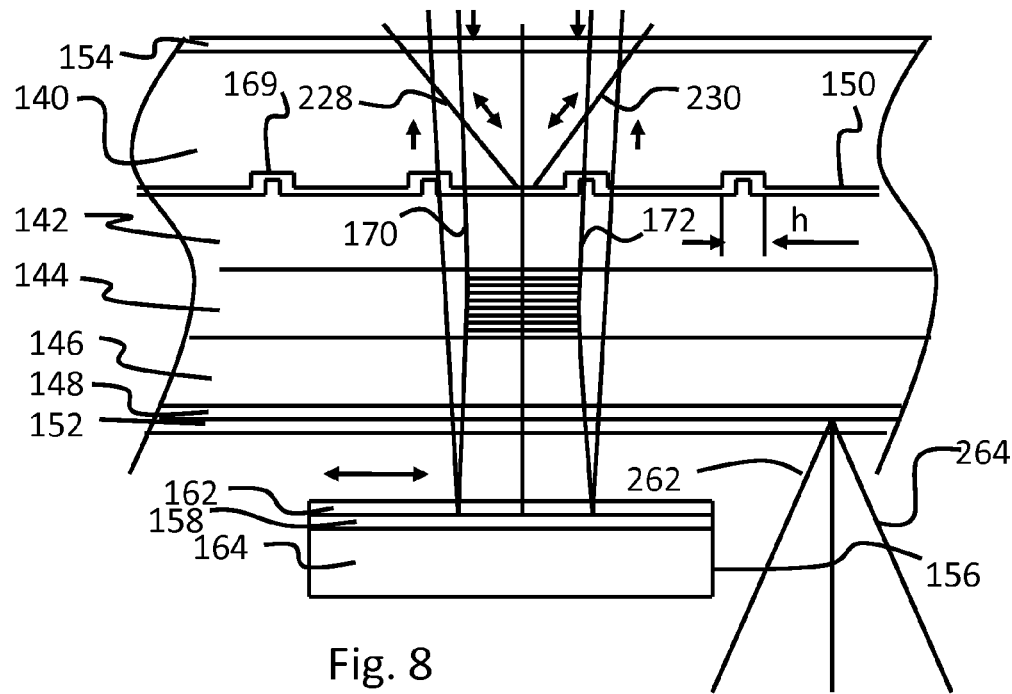
FIG. 8 illustrates the schematic optical structure of the single side storage disk, which is used for the first preferred embodiment of the apparatus, and the small mirror under the beams with beam paths in the data write status.

FIG. 8 illustrates the schematic optical structure of the single side storage disk, which is used for the first preferred embodiment of the apparatus, and the reflective mirror under the disk with the beam paths in the data write status (the shown structure is not drawn in practical ratio). Usually, the disk of this type has a round plate shape with diameter of 5 mm to 2000 mm and thickness of 0.1 mm to 20 mm, and especially if it has the shape and size same as those of the CD and DVD disks, this disk can get much more convenience from the existing optical disk industry for manufacture, store and use. This disk is mounted on a rotation spindle and so is rotatable and removable, or is rotatable and non-removable. In general, there is/are one or multiple (2 to 90 or even more) storage layer(s) in the disk, the thickness of each storage layer is from 0.3 μm to 3 mm. In this embodiment, the disk is rotatable and removable, its shape and size are same as those of the CD and DVD disks, and it has three storage layers with thickness of 3 μm to 100 μm for each layer. This disk comprises a transparent substrate 140, three optical storage medium layers 142, 144, 146, which sensitive wavelength ranges are $\delta\lambda_1$, $\delta\lambda_2$ and $\delta\lambda_3$, two cut-off filter or narrowband reflector layers 148, 150, which transmission wavelength ranges are $\delta\lambda_1+\delta\lambda_2+\delta\lambda_3$, and two transparent cover layers 152 and 154. The grooves are etched, or stamped, or molded onto the bottom surface of the transparent substrate 140 to form concentrically circular or spiral tracks. The transparent substrate 140 and two cover layers 152, 154 are made of polycarbonate, or glass, or other transparent plastics and optical materials. The cover layers are used to protect the bottom storage medium layer and transparent substrate surfaces from scratch, stain and so on, and to reduce unwanted reflections. The refractive indexes of the substrate, the cut-off filter or narrowband reflector layers, the storage medium layers and the cover layers are chosen to make the light reflections at the interfaces between every two contact layers as small as possible, and so the light reflections may be neglected. In order to reduce these reflections, for example, one may make the refractive indexes of every two contact layers be equal or close, or insert a dielectric layer between any two contact layers and make the refractive index of the inserted layer change gradually from equaling that of the layer on its one side to equaling that of the layer on its another side [see the reference: M. Bass, and et cetera, eds., Handbook of Optics, Vol. I, McGraw-Hill, New York, 1995, pp. 42.19-42.34].

For fast moving a mirror under the beams, a small moveable mirror 156, which comprises one nonpolarizing reflective layer 158, a transparent cover layer 162 and a plastic or glass or metal substrate 164, is mounted on an actuator 190, which may be moved by a voice coil like structure 192 perpendicularly to and from the disk plane, that is, along the X axis (see FIG. 1). Thus, the mirror top surface may be kept within a small range of the distance between that surface and the disk. Because the disk is not flat and is not always mounted rigidly parallel to the actuator, the disk will move from and to the actuator during any revolution movements, the actuator needs moving back and forth perpendicularly to the disk plane to keep a fixed distance between the actuator and the disk. The voice coil frequency response is several kHz, which is enough for various disk rotation speeds. Through automatic focusing technology, which will be described underneath, the distance variation between the actuator and the disk may be kept less than 2 μm [see the reference: M. Bass, and et cetera, eds., Handbook of Optics, Vol. I, McGraw-Hill, 1995, p. 31.13-31.14]. The reflective surface of the mirror 156 is plane, or is spherical with a suitable spherical radius, such as 10 μm to 10 mm, to convenience mirror adjustment, reduce vibration influence and reduce diameter expand of the reflected beams. The actuator 190 and the voice coil like structure 192 are further moved by a voice coil motor 194 along disk radial direction, that is, along the Z axis. Thus, the small mirror may be sifted under the beams outgoing from the disk when writing data or erasing the data using the standing waves, and removed from the beams when reading data or erasing the data using the traveling waves. The voice coil motor has long shifting distance of over several ten millimeters with positioning accuracy of a few microns, and its shifting speed is also enough [see website: http://www.moticont.com].

The small mirror is round with a diameter of several millimeters, which will be much larger than the said available smallest diameters of the write, read and erase beams. In non working state, the small mirror is kept at a "waiting" position, which is over several millimeters from the beams outgoing from the disk. Keeping the small mirror at the "waiting" position is through adjusting the position of the voice coil like structure 195 (which is the support base of the actuator 90, see FIG. 1) relative to the voice coil motor 194, and this relative position is always kept via synchronous moving of the support base 195 and voice coil 194 by rigid connection. Although the support base needs moving with the actuator 90 when the actuator 90 reaches the various tracks on the disk, the support base does not need following the automatic tracking movements (that is, making the beam spots centered on a given groove) of the actuator 90. Because the automatic tracking movement range of the actuator 90 is much less than 1 millimeter in the disk plane (see the description underneath), keeping the small mirror at the "waiting" position not to meet the beams outgoing from the disk is easy to do. In the data write status, the small mirror 156 is moved to a "working" position which is under the beams outgoing from the disk by the voice coil motor 194. Also since the automatic tracking movement range of the actuator 90 and the beam diameters are much smaller than the small mirror diameter, the beams passing through the storage layers may always fall upon the small mirror. Via automatic focusing and automatic tracking adjustments of the actuator 90, the beam centers are centered on a given groove with the smallest diameter ranges $\delta_1$, $\delta_2$ and $\delta_3$ of three beam sub-groups 1, 2 and 3 within the storage layers 142, 144 and 146, respectively (also see the description underneath). In FIG. 8, only one beam sub-group with the smallest diameter rang $\delta_2$ within the layer 144 is drawn for clear expression. 170 and 172 are edge light rays of the beams of this sub-group. The illuminating beams are reflected perpendicularly from the small mirror and return back into the storage layers and interfere with the subsequently incident beams. In the interfered area, each of the reflected beams only interferes with the one with same wavelength and polarization direction. Thus, each pair of the interfered beams has same frequency, same polarization direction, almost equal amplitude and opposite traveling direction. The phase difference between each reflected beam and the illuminating beam interfered with it is zero at the small mirror reflective surface, and is fixed within their coherent length. Thus, the plane or quasi-plane standing wave is formed in the interfered area for every illuminating beam [see the reference: M. Bass, and et cetera, edited, Handbook of Optics, Vol. II, 2nd ed., McGraw-Hill, New York, 1995, p. 6.8, p. 6.28]. Each standing wave only forms in the volume with the smallest beam diameter even the reflected beam diameter is expanded. In every standing wave, the light intensity distributes in a manner of periodic multiple plane or quasi-plane layers with the intervals of half of the correspondent wavelength. In order to avoid too much expand of the reflected beam diameter, the small mirror 156 should be close to the disk. As mentioned above, via automatic focusing technology, the distance between the small mirror top surface and the disk may be kept less than several microns.

In this embodiment, the storage layers are made of photo-addressable polymers. These polymers are side-chain copolymer systems functionalized with azobenzene chromophores and mesogenic side groups. The linearly polarized light with high intensity orients the long axis of each azo-chromophore (through light-absorbing) perpendicular to the light polarization direction, resulting in a large birefringence of the bulk material. By changing the light polarization direction or state, the polymers can be switched reversibly between two states which are strongly different in their molecular orientational distributions, including form an isotropic in-plane orientation to a highly anisotropic orientation, from one highly anisotropic orientation to another highly anisotropic orientation, from a highly anisotropic orientation to the isotropic in-plane orientation. By linearly polarized light illumination, the refractive index in the polarization direction (named $n_\parallel$) will decrease and the in-plane index perpendicular to this direction ($n_T$) will accordingly increase.

The photoinducible and erasable birefringence values $\Delta n = n_\parallel - n_T$ depend on the intensity of illumination light, and may be larger than 0.5. Furthermore, by changing the material structures, such as the molecule lengths, these polymers can be adapted to different spectral ranges including the green-yellow, green and blue color ranges [see the reference: R. Hagen and T. Bieringer, "Photoaddressable polymers for optical data storage," Advanced Materials, Vol. 13, No. 23, 2001, pp. 1805-1810]. Thus, each storage medium layer may be made only sensitive to one wavelength range.

In this embodiment, the storage layers 142, 144 and 146 are made sensitive to the wavelength ranges $\delta\lambda_1$, $\delta\lambda_R$ and $\delta\lambda_3$ of the three beam sub-groups 1, 2 and 3, respectively. Thus, each of these beam sub-groups forms the standing waves in only one storage layer. In each standing wave, the light intensity increases to about 4 times as its original intensity at antinodes, and reduces to almost zero at nodes. It is a very large intensity gradient. Furthermore, as the beam converges into tiny volume, the high light intensity and large intensity gradient will change the refractive index of the storage medium. As a result, the distribution of the changed refractive index will be in the manner of periodic multiple plane or quasi-plane layer structure. The period contains any two contact layers is half of the wavelength. This structure is very like the Bragg reflector which is composed of N periodic AB, where A, B represents layers of refractive indexes $n_a$, $n_b$ with the period of $\lambda_m/2$, $\lambda_m$ is the wavelength in the medium. Since the refractive index changes are different along the directions parallel with and perpendicular to the illumination light polarization direction, each of the created Bragg reflector like structures will selectively reflect the beam with matched wavelength and polarization direction, that is, reflect the beam which wavelength and polarization direction are same as those of the beam created that Bragg reflector like structure, and with the reflectivity proportional to the intensity of its creating beam [see the reference: M. Bass, and et cetera, edited, Handbook of Optics, Vol. II, McGraw-Hill, New York, 1995, p. 6.8, p. 6.28]. Such Bragg reflector like structures will remain after the illumination beams go off. With disk rotation and actuator movement along the disk radial direction, the different groups of the Bragg reflector like structures are created in the small volumes crossing through three storage layers and located at the different positions of the disk plane.

It is known that the Bragg reflector can have very high reflectivity if the refractive index difference of two contact layers is large and/or the number of the periods is large. For a periodic multilayer reflector consists of two mediums which refractive index is homogeneous, the highest reflectance occurs whenever $n_a d_a$, $n_b d_b$ are each equal to an odd multiple of $\lambda_m/4$, where $d_a$ and $d_b$ are the thicknesses of the layers made of the mediums A and B, respectively. The maximum intensity reflectance for normal incident light is given by $$R_{max} = \left[ \frac{\frac{n_m}{n_s} - \left(\frac{n_a}{n_b}\right)^{2N}}{\frac{n_m}{n_s} + \left(\frac{n_a}{n_b}\right)^{2N}} \right]^2, \tag{1}$$

where $n_m$ and $n_s$ are indexes of two mediums contacting the both sides of the reflector, respectively [see the reference: M. Bass, and et cetera, edited, Handbook of Optics, Vol. I, McGraw-Hill, New York, 1995, pp. 42.34-42.42]. In the periodic multiple layer structure created by the standing wave, the refractive index is not homogeneous in each layer. The calculation should be somewhat different from the equation (1). However, because the light intensity in the standing wave changes in manner of the square of sine of the displacement, the induced refractive index change is higher somewhere and lower elsewhere than the linear index change. Therefore, such kind of index change is much more like the Bragg reflector than the ones with the linear index change. Therefore, in order to simplify the description, the Bragg reflector like structure created by the standing wave is briefly called as the Bragg reflector in the above and under descriptions.

In order to read the data, the beams from the laser array 4 and 200 are used (see FIG. 3). The semiconductor lasers in the array 200, which have same number and wavelengths as the beams from the laser array 4, are also arranged in a line according to their wavelength order. The powers of the beams from these two laser arrays are modulated to be same and reduced to avoid inducing new changes of the refractive index of the storage medium layers in the disk. The beams from the laser array 200 are linearly polarized light too. Their polarization directions are oriented at 45° relative to the Y axis in YZ plane. In order to reduce the size, correct beam aberration, stabilize wavelength shift, improve the performance, the measures adopted for the laser array 4 may also be used for the laser array 200. The involved optical elements are not drawn in FIG. 2 and FIG. 3 too. The intensities of the beams from the laser array 200 are modulated by electronic controllers included in the processor 8 too. Thus, these beams can pass a polarizing beam splitter 202, which one optical axis is at 45° relative to the Y axis. After these beams pass through an array of optical isolators 204, their polarization directions are rotated −45° becoming parallel with the Y axis, so these beams are reflected by the polarizing beam splitter 14 as the polarizing beam splitter 14 reflects the beams which polarization directions are along the Y axis. Then, the beams from both of the laser arrays 4 and 200 go to the polarization rotator array 16. In the data read status, the polarization rotator array 16 does not change the passing beam polarization directions. Then, these beams arrive at the disk.

When these beams illuminate the data storage layers, they will be wavelength selectively and polarization sensitively reflected with correspondent reflectivities. In the read beams, there are always two orthogonal linearly polarized beams with a same wavelength. Therefore, no matter what direction the molecular orientation of a Bragg reflector is, the light of the beams which wavelengths are matched to that Bragg reflector will be reflected partially. When the beams strike the places where no matched Bragg reflectors, the beams will pass through the storage layers and go out of the disk. In the data read status, the small mirror 156 is removed from the outgoing beams, thus, the light of the beams without matched Bragg reflectors will not come back. In order to reduce the light noise caused by light scattering, the inside surfaces of the apparatus had better be coated by light absorption material, such as carbon black.

The returned beams are dispersed by the prism 84 and converged by the lens 82. Then, each pair of the beams with same wavelength is divided into two parts with a fixed ratio by the nonpolarizing and non-color-selective beam splitter 80. A small part with ratio of 10% to 40% of each pair of the beams with same wavelength is received by each intensity detector in the detector array 206. The detector number in the array 206 is same as the laser number in the array 4. These detectors are arranged in a line and so located at different positions. Thus, the compound intensity of each pair of the beams with a same wavelength is detected, and their wavelength may be determined by intensity detector position. A large part with ratio of 90% to 60% of each pair of the beams with a same wavelength is further divided into two orthogonal polarization components by the polarizing beam splitter 14. The polarization direction of each of these two components will be rotated a further 45° by two optical isolator arrays 12 and 204. Thus, these two components will be reflected to the intensity detector arrays 208 and 210 by two polarizing beam splitters 10 and 202. Please note that one optical axis of the splitter 10 is along the direction at 45° relative to the X axis in XY plane, and that of the splitter 202 at 45° relative to the Y axis in YZ plane.

Then, two orthogonal components are received by two intensity detectors in two detector arrays 208 and 210, respectively. Each pair of such detectors forms a differential detection element. Since two optical axes of the splitter 14 are parallel with and perpendicular to the Y axis, the polarization direction of the component detected by the detector in the array 208 will be perpendicular to the Y axis, and so its intensity may be named as $I_T$. The polarization direction of the component detected by the detector in the array 210 will be parallel with the Y axis, and so its intensity may be named as $I_\parallel$. The values $I_T$ and $I_\parallel$ are sent to an analyzer 212 to produce a differential signal value $\Delta I = I_T - I_\parallel$ there. Thus, a particular direction, which depends on the molecular orientation of each Bragg reflector and is named as the "compound" polarization direction of each pair of the reflected beams with a same wavelength can be calculated. For examples, if $I_T=0$ or $I_\parallel=0$, the "compound" direction will be parallel with or perpendicular to the Y axis. If $I_\parallel=I_T$, the "compound" direction will be oriented at 45° relative to the X axis or at 45° relative to the Y axis. If $I_\parallel > I_T \neq 0$ or $I_T > I_\parallel \neq 0$, the "compound" direction will be close to the Y or the X axis more, and the orientation angle may be calculated from the value $\Delta = I_T - I_\parallel$, which can be a positive value or a negative value. The wavelength correspondent to each "compound" polarization direction can also be determined by the position of each differential detection element. At last, the detected wavelength, intensity and "compound" direction values of all reflected beams are transferred back to the original data through the color shade and polarization direction decoding procedure by an electronic processor 216.

There are various ways to erase the data stored in the disk. They may be divided into two types: one is making the changed medium reflective index become uniform, and the molecular orientations become same or isotropic, which is using traveling waves; another is changing the created Bragg reflector into a special state with a specified reflectivity and a specified polarization and this state is predetermined to represent "no data", which is using standing waves. In both cases, the same multiple linearly polarized laser beams for data write are used as the erase beams.

When using the traveling waves, the intensities of the beams with required wavelengths are raised over the change threshold of the storage medium refractive index during required period(s). The polarization directions of these beams are made become same or circularly rotating. The small mirror 156 is at the "waiting" position. When these beams illuminate the storage layers, as their intensities are higher than the medium refractive index change threshold, the Bragg reflectors in the desired storage layer(s) of the desired storage cell(s) are eliminated. In addition, because the small mirror is not under the beams, no beam is reflected back to form new standing wave in the storage medium. Thus, the illumination beams become the travelling waves, and so the light intensity distributions are uniform in the required storage layer(s) of the required storage cell(s), resulting in a uniform refractive index distribution of the required storage layer(s) of the required storage cell(s). The molecules of all Bragg reflectors in the desired storage layer(s) of the desired storage cell(s) are reoriented along one direction by one direction linearly polarized light, or become isotropic by circularly rotating light. After the erase beams go off, the uniform refractive index distribution with only one molecular orientation or isotropic molecular orientation in the desired storage layer(s) of the desired storage cell(s) will be kept. Thus, by choosing beam wavelengths and controlling beam illumination periods, the created Bragg reflectors in one or multiple storage layer(s) of one or multiple storage cell(s) are eliminated, and so to erase the partial or total stored data.

When using the standing waves, the intensity(ies) of the beam(s) with required wavelength(s) is/are raised over the change threshold of the storage medium refractive index during required period(s) too. The small mirror 156 is moved to the "working" position. The intensity(ies) and polarization direction(s) of this/these beam(s) is/are modulated and rotated to a same specified value and a same specified direction no matter what wavelength of the beam is. Thus, the Bragg reflector(s) created before by the beam(s) with the required wavelength(s) is/are changed into this special state. In the above said color shade and polarization direction encoding and decoding regulations, the composite states consist of this specified intensity, this specified polarization direction and any wavelength are all predetermined to represent "no data". Therefore, by choosing beam wavelength(s) and controlling beam illuminating period(s), one or multiple Bragg reflector(s) is/are rewritten to "no data" state, and so to erase the partial or total stored data.

Because of various reasons including disk surface stains, scratches, mechanical vibrations, manufacturing tolerances, medium difference, etc., the reflectivities of the Bragg reflectors in different storage cells or different disks created by same beam intensity may be different, which will make intensity level identification difficult. One method for solving this problem is to establish one specified reflectivity as reference for every storage cell. It is realized by creating one special "referring" Bragg reflector in every storage cell by using one special illuminating beam, which has a specified wavelength, a specified polarization direction and an allowed highest intensity (which should not damage the storage medium). Thus, a special Bragg reflector is created in every storage cell, which has a specified polarization sensitive direction and produces the highest received intensity. When the beam group reflected from each storage cell is received, the highest intensity is always represented as the intensity value of "1" no matter how much the real value is. Because every other received intensity is below the received highest intensity and has a particular ratio of itself to the received highest intensity, that ratio value can be represented as the value of every other received intensity. So all received intensities can be determined. The area of every storage cell is very small, which diameter is less than several microns usually (see underneath description), so the reflectivity changes of every two Bragg reflectors in one storage cell caused by a same external affect are almost same. Therefore, when the reflectivity of one Bragg reflector is changed, the reflectivities of other Bragg reflectors in the same storage cell will be changed in a same proportion. Because there are many write beams, using one beam to build the "referring" Bragg reflector will not reduce the disk storage capacity obviously. Of course, if the beam number is less, the "referring" Bragg reflectors need to be reduced. The "referring" Bragg reflectors may be built in partial storage cells which are distributed uniformly in the disk with suitable density, or using the special "referring" Bragg reflector also as the Bragg reflector representing "no data", which is described above for data erasing. Thus, one may get more beams for data storage. In addition, for the storage medium which refractive index changes with the wavelength even in the used wavelength range, the received intensities may be corrected by multiplying the received intensities by ratio correction factors according to the spectral response property of that storage medium. The medium spectral response property may be obtained for every disk in the following way: using a special beam group with all write wavelengths to create a "referring" storage cell, every beam in this group with different wavelength has a same specified polarization direction and a same allowed highest intensity, then measuring the intensities and wavelengths of the beams reflected from this "referring" storage cell. Regarding the highest received intensity value as "1", then the reflectivity decline ratio of every received beam with different wavelength may be determined by comparing that received intensity with the highest received one. Thus, the storage medium, that is, the disk spectral response property is obtained. These decline ratios can be used as the ratio correction factors. By dividing the other received intensities by these decline ratios according to their wavelengths, the wavelength caused ununiformity of the received beam intensities can be corrected. Since every storage cell in one disk has same storage layer number, and each of these layers are made of same materials, the ratio correction factors obtained from the "referring" storage cell can be used for every storage cell in the same disk.

At present, almost all of the digital data are stored in the binary numeral form, including the data stored in the optical storage mediums like the CD, DVD and Blu-ray disks. In the binary numeral system, the information unit is bit, which is the amount of the data stored in one of two possible distinct states. So one bit can hold two values at its maximum. The groups of the data with 2-bit, 3-bit, 4-bit, 5-bit and 6-bit sizes can hold $2^2=4$, $2^3=8$, $2^4=16$, $2^5=32$ and $2^6=64$ values maximumly. Therefore, the maximum values which can be stored in the data group with M-bit size is $2^M$.

For the storage system using color shade and polarization direction encoding, the maximum value which can be stored in one data group depends on how many wavelengths, intensity levels and polarization directions are used. The available composite states for the beam group consist of 3 wavelengths, 2 intensity levels and 2 polarization directions is shown in the Table A. In the Table A, every composite state is symbolized by WIP, where W is 1, 2, or 3, which represents one of 3 wavelengths, I is A or B, which represents one of 2 intensity levels, and P is a or b, which represents one of 2 polarization directions.

TABLE A

Available Composite States of 3 Beams with Different Wavelength
(Every beam has 2 available intensity levels and 2 available polarization directions)

| 01 | 1Aa | 2Aa | 3Aa |
|---|---|---|---|
| 02 | 1Aa | 2Aa | 3Ab |
| 03 | 1Aa | 2Aa | 3Ba |
| 04 | 1Aa | 2Aa | 3Bb |
| 05 | 1Aa | 2Ab | 3Aa |
| 06 | 1Aa | 2Ab | 3Ab |
| 07 | 1Aa | 2Ab | 3Ba |
| 08 | 1Aa | 2Ab | 3Bb |
| 09 | 1Aa | 2Ba | 3Aa |
| 10 | 1Aa | 2Ba | 3Ab |
| 11 | 1Aa | 2Ba | 3Ba |
| 12 | 1Aa | 2Ba | 3Bb |
| 13 | 1Aa | 2Bb | 3Aa |
| 14 | 1Aa | 2Bb | 3Ab |
| 15 | 1Aa | 2Bb | 3Ba |
| 16 | 1Aa | 2Bb | 3Bb |
| 17 | 1Ab | 2Aa | 3Aa |
| 18 | 1Ab | 2Aa | 3Ab |
| 19 | 1Ab | 2Aa | 3Ba |
| 20 | 1Ab | 2Aa | 3Bb |
| 21 | 1Ab | 2Ab | 3Aa |
| 22 | 1Ab | 2Ab | 3Ab |
| 23 | 1Ab | 2Ab | 3Ba |
| 24 | 1Ab | 2Ab | 3Bb |
| 25 | 1Ab | 2Ba | 3Aa |
| 26 | 1Ab | 2Ba | 3Ab |
| 27 | 1Ab | 2Ba | 3Ba |
| 28 | 1Ab | 2Ba | 3Bb |
| 29 | 1Ab | 2Bb | 3Aa |
| 30 | 1Ab | 2Bb | 3Ab |
| 31 | 1Ab | 2Bb | 3Ba |
| 32 | 1Ab | 2Bb | 3Bb |
| 33 | 1Ba | 2Aa | 3Aa |
| 34 | 1Ba | 2Aa | 3Ab |
| 35 | 1Ba | 2Aa | 3Ba |
| 36 | 1Ba | 2Aa | 3Bb |
| 37 | 1Ba | 2Ab | 3Aa |
| 38 | 1Ba | 2Ab | 3Ab |
| 39 | 1Ba | 2Ab | 3Ba |
| 40 | 1Ba | 2Ab | 3Bb |
| 41 | 1Ba | 2Ba | 3Aa |
| 42 | 1Ba | 2Ba | 3Ab |
| 43 | 1Ba | 2Ba | 3Ba |
| 44 | 1Ba | 2Ba | 3Bb |
| 45 | 1Ba | 2Bb | 3Aa |
| 46 | 1Ba | 2Bb | 3Ab |
| 47 | 1Ba | 2Bb | 3Ba |
| 48 | 1Ba | 2Bb | 3Bb |
| 49 | 1Bb | 2Aa | 3Aa |
| 50 | 1Bb | 2Aa | 3Ab |
| 51 | 1Bb | 2Aa | 3Ba |
| 52 | 1Bb | 2Aa | 3Bb |
| 53 | 1Bb | 2Ab | 3Aa |
| 54 | 1Bb | 2Ab | 3Ab |
| 55 | 1Bb | 2Ab | 3Ba |
| 56 | 1Bb | 2Ab | 3Bb |
| 57 | 1Bb | 2Ba | 3Aa |

TABLE A-continued

Available Composite States of 3 Beams
with Different Wavelength
(Every beam has 2 available intensity levels
and 2 available polarization directions)

| 58 | 1Bb | 2Ba | 3Ab |
| 59 | 1Bb | 2Ba | 3Ba |
| 60 | 1Bb | 2Ba | 3Bb |
| 61 | 1Bb | 2Bb | 3Aa |
| 62 | 1Bb | 2Bb | 3Ab |
| 63 | 1Bb | 2Bb | 3Ba |
| 64 | 1Bb | 2Bb | 3Bb |

One can see that the maximum number of the composite states written by the beam groups of W=3, I=2 and P=2 are $(2\times 2)^3=64$. It is easy to demonstrate that the maximum number of the composite states written by the beam group of W=3, I=3 and P=2 is $(3\times 2)^3=216$, and so on. Therefore, if a beam group has $N_W$ beams with different wavelengths, and every beam has $N_I$ available intensity levels and $N_P$ available polarization directions, the maximum composite state number of this beam group, which equals the maximum value stored in the storage cell written by this beam group, is $(N_I \times N_P)^{N_W}$. One can see that the data storage capacity of such a storage cell is very high if $N_W$, $N_I$ and $N_P$ are moderate large.

In order to increase data storage density, the created Bragg reflector diameters should be as small as possible. The reflector diameter is limited by the reflector length due to light diffraction. The Bragg reflector must have certain length to contain enough periodic layers with altered refractive indexes to produce required reflectivity. In addition, as there are multiple Bragg reflectors which are superposed to each other in the every small volume, each of these reflectors may be identified only when each of them consists of enough refractive index altered layers.

There are several ways to calculate the available smallest Bragg reflector diameter for the given Bragg reflector length. From the point of view of the beam focusing by a lens, and according to the classical theory of diffraction, the depth $\delta$ of focus of a lens, which is the distance away from the focal plane over which the tight focus can be maintained, is $$\delta \cong \frac{\lambda}{N_A^2}, \quad (2)$$

and the diameter d of the beam at the objective's focal plane is $$d \cong \frac{\lambda}{N_A}, \quad (3)$$

where $\lambda$ is the beam wavelength and $N_A$ is the numerical aperture of the lens [see the reference: M. Bass, and et cetera, eds., Handbook of Optics, Vol. I, McGraw-Hill, 1995, pp. 31.10-31.12]. If the beam travels in the medium with the refractive index of n, the wavelength $\lambda$ in the equations (2) and (3) should be changed by $\lambda/n$.

Usually, the thickness of the optical disk, such as the CD, DVD and Blu-ray disk, is 1.2 mm. Thus, the total thickness of all storage layers may be over 1000 μm. The wavelengths of the semiconductor lasers used for the CD, DVD and Blu-ray drives are 0.83 μm, 0.65 μm and 0.405 μm, respectively. The refractive index of the storage layers, when using the photorefractive, polarization and wavelength sensitive photopolymers, photopolymers doped with special dopants and suitable optical crystals, is from 1.4 to 2.6 approximately [see the reference: E. Leite, and et cetera, "Optical properties of photopolymer layers doped with aluminophosphate nanocrystals," J. Phys. Chem. C, Vol. 114, No. 39, 2010, pp. 16767-16775; T. J. Trentler, and et cetera, "Epoxy resin-photopolymer composites for volume holography," Chem. Mater., Vol. 12, No. 5, 2000, pp. 143'-1438].

From the equations (2) and (3), the smallest diameter d of the beam in the medium with refractive index of n is $$d = \sqrt{\delta \frac{\lambda}{n}}. \quad (4)$$

When the depth $\delta$ of focus of the focused beam is taken from 10 μm to 40 μm, the wavelength $\lambda$ is from 0.405 μm to 0.65 μm, and the refractive indexes are 2.4 and 1.7, the available smallest beam diameter d is from 1.299 μm to 3.910 μm. For example, if $\lambda=0.605$ μm, $\delta=30$ μm and n=1.7, then d=3.386 μm; if $\lambda=0.55$ μm, $\delta=20$ μm and n=2.4, then d=2.14 μm.

The light reflectivity of the Bragg reflector can be calculated by the equation (1) based on the reason explained above. The photoaddressable polymers can be written and erased by focused short laser pulses of 10 μs with focused diameter 1 to 2 μm and power 20 mW. The induced refractive index changes are up to 0.5 [see the reference: R. Hagen and T. Bieringer, "Photoaddressable polymers for optical data storage," Advanced Materials, Vol. 13, No. 23, 2001, pp. 1805-1810]. If laser power is higher, the write beam focused diameter may be larger. The semiconductor laser power can easily reach 50 mW now. The Table B shows the light reflectivities of the Bragg reflectors with the length L from 10 μm to 40 μm in two mediums with refractive indexes of 1.7 and 2.4. The reflectivity value R in different rows is correspondent with different wavelengths $\lambda$ and different index change $\Delta n$. Please note that the real Bragg reflector length in the medium is L/n.

TABLE B

Reflectivities R of the Bragg Reflectors Created in the Mediums of n = 1.7 and 2.4
($\lambda$ and L are measured in μm)

| | | | L | | | | | | |
|---|---|---|---|---|---|---|---|---|---|
| | | | 10 | 15 | 20 | 25 | 30 | 35 | 40 |
| $\Delta n$ | n | $\Lambda$ | | | | R | | | |
| 0.02 | 1.7 | 0.405 | 0.565 | 0.808 | 0.923 | 0.970 | 0.988 | 0.995 | 0.998 |
| 0.02 | 1.7 | 0.55 | 0.380 | 0.629 | 0.798 | 0.896 | 0.948 | 0.974 | 0.987 |

TABLE B-continued

Reflectivities R of the Bragg Reflectors Created in the Mediums of n = 1.7 and 2.4
($\lambda$ and L are measured in μm)

| | | | L | | | | | | |
|---|---|---|---|---|---|---|---|---|---|
| | | | 10 | 15 | 20 | 25 | 30 | 35 | 40 |
| $\Delta n$ | n | $\Lambda$ | | | | R | | | |
| 0.02 | 1.7 | 0.65 | 0.295 | 0.522 | 0.704 | 0.826 | 0.901 | 0.945 | 0.969 |
| 0.02 | 2.4 | 0.405 | 0.565 | 0.808 | 0.923 | 0.970 | 0.988 | 0.995 | 0.998 |
| 0.02 | 2.4 | 0.55 | 0.380 | 0.629 | 0.798 | 0.896 | 0.948 | 0.974 | 0.987 |
| 0.02 | 2.4 | 0.65 | 0.295 | 0.522 | 0.704 | 0.826 | 0.901 | 0.945 | 0.969 |
| 0.05 | 1.7 | 0.405 | 0.968 | 0.997 | 0.999 | 0.999 | 0.999 | 0.999 | 0.999 |
| 0.05 | 1.7 | 0.55 | 0.891 | 0.980 | 0.996 | 0.999 | 0.999 | 0.999 | 0.999 |
| 0.05 | 1.7 | 0.65 | 0.819 | 0.956 | 0.990 | 0.997 | 0.999 | 0.999 | 0.999 |
| 0.05 | 2.4 | 0.405 | 0.968 | 0.997 | 0.999 | 0.999 | 0.999 | 0.999 | 0.999 |
| 0.05 | 2.4 | 0.55 | 0.891 | 0.980 | 0.996 | 0.999 | 0.999 | 0.999 | 0.999 |
| 0.05 | 2.4 | 0.65 | 0.819 | 0.956 | 0.990 | 0.997 | 0.999 | 0.999 | 0.999 |

In the Table B, when the thickness of the storage layer is 20 μm, the light reflectivities are from 70% to 99.9% for beams with wavelengths of 0.65 μm to 0.405 μm and index changes $\Delta n$ of 0.02 and 0.05. The medium refractive indexes are 1.7 and 2.4, respectively. Such reflectivities can provide wide dynamic ranges to produce shade levels for encoding a large number of data. For example, if the detecting resolution for intensity is 1%, and the intensity loss caused by any reasons is less than 10%, the reflectivity of 70% or 99% can produce 60 or almost 90 shade levels for each wavelength and polarization direction. In a completed experiment, 32 distinct gray levels have been produced in a just 0.25 μm thick photoaddressable polymer. In addition, the photorefractive, polarization and wavelength sensitive material has shown good holographic recording features. For example, the volume phase holograms made of the photoaddressable polymers have exhibited large diffraction efficiencies of more than 90% with thicknesses ranges from 5 to 200 μm, and high Bragg selectivity with angle resolution of $\Delta\theta<0.2°$ in an angular multiplexing experiment, which allow ones to write several hundred holographic gratings on a 3×3 mm² area [see the reference: R. Hagen and T. Bieringer, "Photoaddressable polymers for optical data storage," Advanced Materials, Vol. 13, No. 23, 2001, pp. 1805-1810]. In the angular multiplexing experiment, with swinging the storage layer, the interference fringes of every hologram are created at the different spatial positions. Depending on these spatial position differences, these holograms can be detected and distinguished later. The spatial position differences of the interference fringes may also be created by the wavelength change of the interferer beams. So as long as the difference between any two wavelengths is fairly large, the Bragg reflectors created by the beams with these wavelengths can be distinguished too.

In each group of the collinear, concentric and parallel beams, the beam with the longest wavelength will produce the largest beam diameter, that is, produce the largest light spot on the storage layer. This spot determines the size of the area occupied by this beam group. On the optical storage disk the data are recorded along the tracks. Thus, the area size $\Delta S$ for storing a data group is $\Delta S=(d+h)^2$, where h is the width of the land which separates the grooves (see FIG. 8), and d is the largest one among the available smallest diameters of the write beams. In every volume of $\Delta S \times \delta_{ALL}$ ($\delta_{ALL}=\delta_1+\delta_2+\delta_3+ \ldots +\delta_M$, where $\delta_1, \delta_2, \delta_3, \ldots$ and $\delta_M$ are the thicknesses of the storage layers 1, 2, 3, ... and M, respectively. For the disk shown in FIG. 8, $\delta_{ALL}=\delta_1+\delta_2+\delta_3$), multiple Bragg reflectors with different reflectivities and polarization sensitivity are created. The maximum data storage capacity of each volume of $\Delta S \times \delta_{ALL}$ depends on the maximum number $M_{CS}$ of the available composite states of the wavelengths, intensities and polarization directions of the write beams. As the expressed in the Table A, If a beam group consists of $N_W$ beams with different wavelengths, and every beam has $N_I$ available intensities and $N_P$ available polarization directions, this beam group can provide $(N_I \times N_P)^{N_W}$ different composite states for encoding the data stored into the volume of $\Delta S \times \delta_{ALL}$. In the existing optical storage disks, such as the CD, DVD and Blu-ray disks, the data are stored in the binary numerical form. The amount of the stored data is expressed by quantity of bits. Because these disks are non-volumetric storage mediums, each group of data is stored in an area of $\Delta S'$. It is indicated above, if an area $\Delta S'$ has a storage capacity of M-bits, this area will provide $2^M$ different states to store the data.

For any two data storage systems, if they can provide the same number of the distinct physical states, which may be the stable states of a flip-flop, the distinct voltage or current levels, the distinct light wavelengths, the distinct light intensity levels, the magnetization directions, the light polarization directions, and so on, to store the data, these two systems have the same storage capacity. Therefore, when one optical storage system utilizing multi-wavelength, multi-intensity and multi-polarization and another optical storage system utilizing one wavelength and two intensities (that is, zero and a fixed value, which is used for the CD, DVD and the Blu-ray disks) have the same number of the distinct states, they should have the same storage capacity. Thus, from $$2^M = (N_I \times N_P)^{N_W}, \quad (5)$$

one gets $$M = \log_2[(N_I \times N_P)^{N_W}]. \quad (6)$$

In the equation (6), M is counted by the binary numerical unit bit. The equation (6) indicates that for a volume of $\Delta_S \times \delta_{ALL}$, if the data stored in it were written by $N_W$ beams which have different wavelengths and every of these beams has $N_I$ available intensities and $N_P$ available polarization directions, the value of the stored data is $M=\log_2((N_I \times N_P)^{N_W})$ bits. Thus, the storage capacity of the volume of $\Delta S \times \delta_{ALL}$ may be expressed by the quantity of bits according to the equation (6).

Suppose the disk shown in FIG. 8 has the same shape and size as the CD and DVD disks. The CD and DVD disks have a round shape with a diameter of 120 mm. At the disk center, there is a support hub which diameter is 44 mm. Thus, the maximum storage area of such disk is $S=\pi(60^2-22^2)$ mm².

The total data storage capacity of the disk depends on the storage density. As mentioned above, the smallest storage unit is the volume $\Delta S \times \Delta_{ALL}$, where $\Delta S=(d+h)^2$. Thus, the storage capacity Cs of such a disk can be calculated by $$Cs = M \times \left(\frac{S}{\Delta S}\right). \quad (7)$$

The actuator 90 (see FIG. 1) may be kept with a fixed distance to the disk surface when disk rotates. The distance undulation between the actuator and the disk surface may be kept less than 2 μm by using automatic focusing technology (see the description underneath). Therefore, the thickness of each storage layer may be made equal to the depth of focus of the correspondent sub-group of the write beams, such as the thickness of the storage layer 142, 144, 146, and so equal to the $\delta_1/n$, $\delta_2/n$, $\delta_3/n$, respectively (see FIG. 7 and FIG. 8, n is the refractive index of the storage medium layer), and the depths of focus of these write beam sub-groups may be kept within their correspondent storage layers. If the thickness of each layer is less than several tens of microns, a 1.2 mm thick disk can contain several tens of layers. Because each of these storage layers is only sensitive to a particular wavelength range, by making the wavelengths of the beams in each sub-group correspondent only with a particular layer, the beams in each sub-group will only interact with its correspondent storage layer. Thus, the Bragg reflectors created in each storage layer become much fewer, resulting in that the Bragg reflectors created by several tens to even several hundreds of beams can be stored in one volume $\Delta S \times \delta_{ALL}$ without difficulty because one storage cell may consist of multiple storage layers. Also as the demonstrated in Table B, the light reflectivity of the Bragg reflectors with length of several ten microns is high and so has large dynamic range, so up to 90 intensity levels can be identified. The change range of the reflected beam polarization direction is 90°, if the angle resolution of the polarization direction is 30°, 15°, 6°, 3°, 2°, 1.5° and 1°, the number of identifiable polarization directions is 4, 7, 16, 31, 46, 61 and 91, respectively.

The Table C shows the data storage capacities $C_S$ of the invented disk calculated by the equation (7). In the calculations, the depth of focus values δ are taken as 10 μm, 16 μm, 20 μm and 30 μam (please note that δ/n is the real thickness of the storage layer), then using the equation (4) to get correspondent smallest beam diameter d values. Taking h=0.1 μm for calculating ΔS. In the Table C, n is the storage layer refractive index, λ is the longest wavelength of the write beam group. $N_P$ and $N_I$ are the numbers of the available polarization directions and intensity levels of each beam in the write beam group. $N_W$ is the wavelength number of the write beam group. The values δ and λ are measured in microns, and the storage capacity $C_S$ is counted in GigaBits.

TABLE C

Data Storage Capacity $C_S$ of per Single-Side Disk using Multi-wavelength, Multi-intensity and Multi-polarization Write Beams

| n | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 |
|---|---|---|---|---|---|---|---|---|---|---|---|---|---|---|---|
| λ | 0.65 | 0.65 | 0.65 | 0.65 | 0.65 | 0.55 | 0.55 | 0.55 | 0.55 | 0.55 | 0.405 | 0.405 | 0.405 | 0.405 | 0.405 |
| δ | 30 | 30 | 20 | 16 | 16 | 30 | 30 | 20 | 16 | 16 | 30 | 20 | 20 | 10 | 10 |
| $N_P$ | 16 | 16 | 31 | 46 | 46 | 16 | 16 | 31 | 46 | 46 | 7 | 16 | 31 | 61 | 91 |
| $N_I$ | 15 | 20 | 40 | 60 | 60 | 15 | 20 | 40 | 60 | 60 | 30 | 30 | 60 | 60 | 90 |
| $N_W$ | 4 | 15 | 20 | 30 | 60 | 10 | 20 | 60 | 180 | 300 | 10 | 30 | 50 | 300 | 310 |
| $C_S$ | 25 | 101 | 245 | 507 | 1014 | 75 | 158 | 864 | 3570 | 5950 | 98 | 502 | 1020 | 12871 | 14605 |
| n | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| λ | 0.65 | 0.65 | 0.65 | 0.65 | 0.65 | 0.55 | 0.55 | 0.55 | 0.55 | 0.55 | 0.405 | 0.405 | 0.405 | 0.405 | 0.405 |
| δ | 30 | 30 | 20 | 16 | 16 | 30 | 30 | 20 | 16 | 16 | 30 | 20 | 20 | 10 | 10 |
| $N_P$ | 16 | 16 | 31 | 46 | 46 | 16 | 16 | 31 | 46 | 46 | 7 | 16 | 31 | 61 | 91 |
| $N_I$ | 15 | 20 | 40 | 60 | 60 | 15 | 20 | 40 | 60 | 60 | 30 | 30 | 60 | 60 | 90 |
| $N_W$ | 4 | 15 | 20 | 30 | 60 | 10 | 20 | 60 | 180 | 300 | 10 | 30 | 50 | 300 | 310 |
| $C_S$ | 36 | 140 | 341 | 705 | 1411 | 104 | 220 | 1202 | 4961 | 8269 | 137 | 697 | 1417 | 17762 | 20155 |

From the Table C, one can see that the invented disk has huge storage capacity, which is much more than that of the Blu-ray disk. For example, if using 15 write beams with different wavelengths, and if each beam has 20 available intensity levels and 16 available polarization directions, the storage capacity of a single-side disk is 101 GB. Its storage layer thickness and the longest wavelength of the write beams are 30/n μm (17.6 μm) and 0.65 μm respectively. Its storage layer refractive index n is 1.7. If this disk has 3 storage layers, each of them only needs to store 5 Bragg reflectors. This disk can easily become the next generation storage medium for popular use after the Blu-ray technology because the storage capacity of each new generation disk is about 5 times that of its elder one (the storage capacity of the CD, DVD and Blu-ray disks are 0.7 GB, 4.7 GB and 25 GB, respectively). When the write beams are more, and/or each write beam has more available intensities and/or more available polarization directions, the disk storage capacity will increase more. For examples, if the write beams are 60, and each of them has 60 available intensities and 46 available polarization directions, the storage capacity of a single-side disk is 1014 GB=1.01 TB; If the write beam are 300, and each of them has 60 available intensities and 61 available polarization directions, the storage capacity of a single-side disk is 12.87 TB. If the former has 20 storage layers and the latter has 30 storage layers, each layer of the former and the latter needs to store 3 and 10 Bragg reflectors. If each layer thickness of the former and the latter is 16 μm and 10 μm, the thicknesses of all storage layers in two disks are less than 320 μm and 300 μm respectively as n=1.7. When the refractive index of the storage layer is higher, the disk storage capacity can be larger. In the Table C, the increased storage capacities due to using a higher refractive index of 2.4 are shown for comparing. For example, if using 310 write beams, each of them has 90 available intensities and 91 available polarization directions, the storage capacity of a single-side disk is 20.16 TB. Therefore, the invented disk is an excellent candidate for colossal amount of data storage.

During all write, read and erase operations, the actuator 90 with the mounted reflectors, mirror, convergent and divergent lenses must remain fixed distance from the disk (see FIG. 1). A linearly polarized beam emitted from the semiconductor laser 220 is used as the adjustment beam for the actuator 90, after collimated by a focusing lens 222, this beam becomes parallel and its polarization direction is along the Z axis, so this beam can pass the polarizing beam-splitter 224. Then, its polarization direction is oriented at 45° relative to the Z axis in YZ plane by a Faraday rotator 226. The wavelength of this beam is selected so that it can be reflected by the nonpolarizing and color-selective beam splitter 86. Then, it enters the actuator 90. The wavelength of this beam is also chosen to be without the transmission range of the round cut-off reflector 92 (see FIG. 6), or without the transmission ranges of the nonpolarizing and color-selective reflector 110 and the nonpolarizing cut-off reflector 130 (see FIG. 7). Thus, the central part of this adjustment beam is blocked by the reflector 92, or is blocked by the reflector 130 after reflected by the reflector 110. The sizes of the cut-off reflector 92 and the three nonpolarizing cut-off reflectors 130, 132 and 134 are fairly small to let most light of this adjustment beam can reach the disk. Thus, after converged by the lens 100 or 112, most light of this adjustment beam illuminates the disk.

Because a cut-off filter or narrowband reflector layer 150 is coated on the grooves on the bottom surface of the substrate 140, which form concentrically circular or spiral tracks, by choosing this adjustment beam wavelength to be without the transmission range of the layer 150, this adjustment beam will be reflected back by the layer 150. This adjustment beam and the write, read and erase beams are arranged to be collinear and concentric, and this adjustment beam focus and the smallest diameters of each write, read and erase beam sub-group are at different depths with fixed intervals. Therefore, when this adjustment beam focus is on the groove surface, the smallest diameters of each write, read and erase beam sub-group are within the correspondent layers of the storage medium as shown in FIG. 8. In FIG. 8, 228 and 230 are edge light rays of this adjustment beam. This adjustment beam may reach the groove surface in all statuses of the write, read and erase. Then, this adjustment beam returns back from the disk. It will be reflected again by the beam-splitter 86. Then, its polarization direction is rotated another 45° by the optical rotator 226 and becomes parallel with the Y axis. So this beam will be reflected by the polarizing beam-splitter 224. Finally, this returned adjustment beam is divided by a nonpolarizing beam-splitter 232 which has a reflective mirror with 50% reflectivity on the diagonal interface. The two separated parts of this adjustment beam are received by two split-detectors, which consist of the photo-sensors 233, 234, 236 and 238, for automatic focusing and tracking, respectively.

The actuator 90 has a voice coil like structure 197 and is allowed to move back and forth to keep the distance between the actuator and the disk within a required range. Since the disk turns at a few thousand revolutions per minute generally, the disk moves in and out of the desired position a few times during each revolution, so the voice coil has a frequency response of up to several kHz. In the scheme called obscuration method, a focusing lens 240 with one-half of its aperture covered by a block 242 is placed in the path of the returned adjustment beam, and a split-detector consists of the sensors 233 and 234 is placed at the focal plane of the lens 240. When the disk groove surface is in focus, the returning adjustment beam is collimated and the lens 240 will focus the beam at the center of the split-detector, giving a difference signal, which is obtained by a differential amplifier connected to two sensors 233 and 234, equal to zero. If the groove surface moves away from the actuator, the returning adjustment beam will become converging, sending all the light to sensor 233. In this case the difference signal will be positive and the voice coil like structure will push the actuator toward the disk. On the other hand, when the disk moves close to the actuator, the returning adjustment beam becomes diverging and the light goes to the sensor 234. This results in a negative difference signal which forces the voice coil like structure to pull back and return the difference signal to zero [see the reference: M. Bass, and et cetera, eds., Handbook of Optics, Vol. I, McGraw-Hill, 1995, p. 31.13-31.14]. In this way, the smallest diameters of each write, read and erase beam sub-group are kept within the correspondent storage medium layers.

Usually, any groove, that is, any track eccentricity will cause an apparent motion of the track toward or away from the common center of the write, or read, or erase beam spots. The track movements along the disk radial direction depends on a number of factors, including centering accuracy of the disk hub, deformability of the disk substrate, mechanical vibrations, manufacturing tolerances, etc. In order to obtain reliable write, read and erase on every track, the illumination beams can't miss the track for a good fraction of every revolution cycle.

The automatic track-following system is also shown in FIG. 1. The system also has a voice coil like structure mounted on the support base 195 of the actuator 90. The signal controlling the actuator is derived from the returned light reflected from the grooves. As shown in FIG. 8, grooves are continuous depressions on the substrate 140. The lands, such as 169, are used for providing a guard band between neighboring grooves. The groove width is determined by said available smallest diameters of the write, read and erase beams. The lands are much narrower than the grooves. The geometrical shape of the land's cross section may be rectangular, triangular, or other symmetric shapes. The above said adjustment beam for automatic focusing is used as automatic tracking adjustment beam too. As this adjustment beam and the said multiple write, read and erase beams are arranged to be collinear and concentric, when this adjustment beam focus is at the middle of the groove, it is also at the common center of the write, read and erase beam spots, and these beam spots move with the adjustment beam focus. When the spot of the central part of this adjustment beam is centered on a given groove, it is diffracted symmetrically from the two edges, resulting in a balanced far-field pattern on a split photo-detector consisting of two sensors 236 and 238 (see FIG. 1), which is placed in the path of the returned adjustment beam. When the spot moves away from the center, the symmetry breaks down and the far-field distribution tends to shift to one side or the other, resulting in unequal light intensity distribution on the sensors 236 and 238. Therefore the split-detector senses the relative position of the spot and provides an appropriate feedback signal. The intensity plots at the detector plane of the light from various locations on the grooved surface are different, that is, how the intensity shifts to one side or the other depending on whether the spot moves to the right edge or to the left edge of the groove, and so the actuator 90 moves to correct direction [see the reference: M. Bass, and et cetera, eds., Handbook of Optics, Vol. I, McGraw-Hill, 1995, p. 31.15-31.18]. In this way, the spots of each write, read and erase beam sub-group are kept within the groove.

Such kind of automatic focusing and tracking mechanisms may make the invented method and its apparatus have good compatibility with the existing CD and DVD drives. By turning off the powers of the laser arrays 4 and 200 and using the above said adjustment beam also as the write, read and erase beams, a CD or DVD disk may be used by the invented apparatus. Because the existing CD and DVD drives have similar automatic focusing and tracking systems as those described above, and their automatic focusing and tracking adjustment beam is the write, read and erase beam too, if the invented apparatus has the disk with the same shape and size as those of the CD or DVD ones. the actuator 90 will move to focus the adjustment beam on the data storage layer of the CD or DVD disk, and to center the beam spot at the data storage track (suppose the wavelength of the adjustment beam is same as, close to or shorter than that used for the CD or DVD drive). If the wavelength of the adjustment beam is short enough, the invented apparatus may even be compatible with the Blu-ray disk, at least in principle. The stored data may be read by sharing the light signals received by the split-detector consisting of the sensors 236 and 238. No matter how the light distributes on the sensors 236 and 238, when the total light energy received by two sensors is over a certain value, then the received datum is 1. When the total received light energy is under that value, the received datum is 0. The data write, read and erase may be realized by modulating the adjustment beam power.

The small mirror 156 is kept with a fixed distance from the bottom surface of the disk by automatic focusing of the actuators 190 (see FIG. 1). A linearly polarized beam emitted from the semiconductor laser 250 is used as the adjustment beam, after collimated by a focusing lens 252, this beam becomes parallel and its polarization direction is along the Y axis, so this beam is reflected by the polarizing beam-splitter 254. Then, its polarization direction is oriented at 45° relative to the Y axis in XY plane by a Faraday rotator 256, and enters the actuator 190. After reflected by a mirror 258 and converged by a lens 260, this adjustment beam focuses on the bottom cut-off filter or narrowband reflector layer 148 of the disk (see FIG. 8). 262 and 264 are edge light rays of this adjustment beam. This adjustment beam wavelength is without the transmission wavelength range $\delta\lambda_1+\delta\lambda_2+\delta\lambda_3$ of the layer 148, so it is reflected by the layer 148. The distance between the focus of this adjustment beam and the top surface of the small mirror 156 is fixed with a small value, such as from 3 μm to 50 μm. Therefore, when this adjustment beam focus is on the layer 148, the top surface of the small mirror 156 is close to the disk bottom surface with a small and fixed distance. Then, this adjustment beam returns back and its polarization direction will be further rotated 45° by the optical rotator 256 becoming parallel with the X axis (see FIG. 1). So this beam can pass the polarizing beam-splitter 254, and is received by a split-detector consisting of two photo-sensors 266 and 268. A focusing lens 262 with one-half of its aperture covered by a block 264 is placed in the path of the returned adjustment beam, and the split-detector is placed at the focal plane of the lens 262. Then through a same process as that described for the automatic focusing of the actuator 90, the top surface of the small mirror 156 is always kept with a small distance from the disk bottom surface, and that small distance change range can be less than 2 μm.

Figure 9:
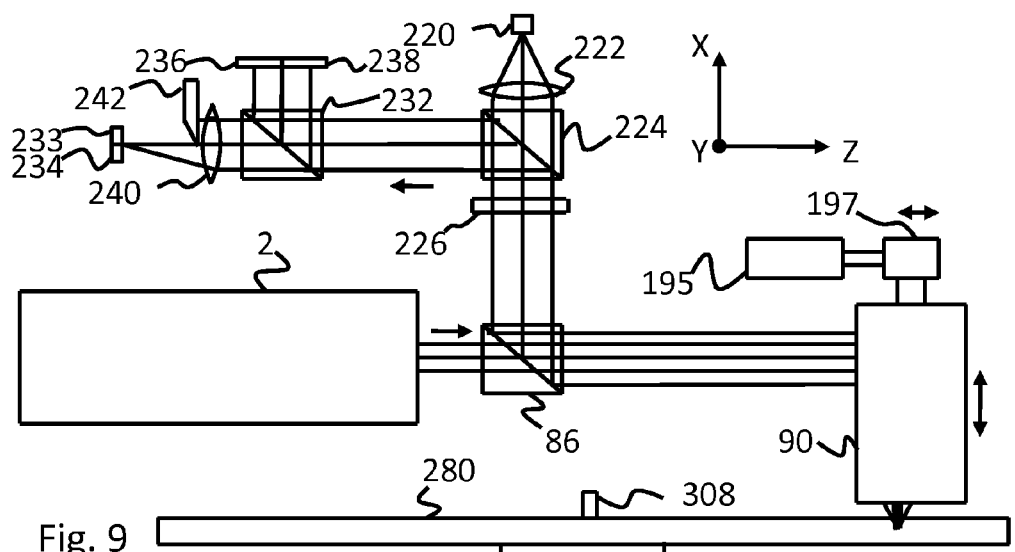
FIG. 9 illustrates the schematic optical structure of the storage apparatus with the disk as the second preferred embodiment of the apparatus according to the invention.
Figure 10:
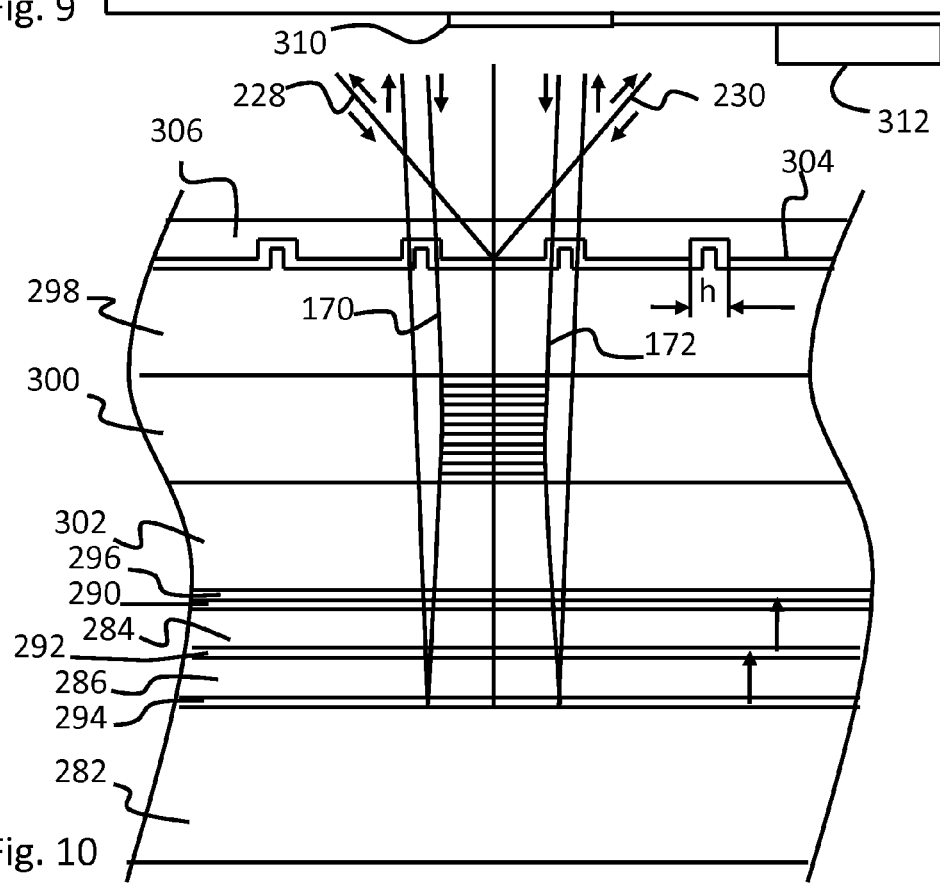
FIG. 10 illustrates the schematic optical structure of the single side storage disk, which is used for the second preferred embodiment of the apparatus, and beam paths in the data write status.

FIG. 9 illustrates the schematic optical structure of the storage apparatus with the disk as the second preferred embodiment of the apparatus according to the invention. The only difference between the first and the second preferred embodiments of the apparatus is using different storage disks. By removing the small mirror 156 and its automatic focusing system, and replacing the disk 119 by a disk 280, which structure is shown in FIG. 10, the structure shown in FIG. 1 becomes the structure of the second embodiment of the apparatus, which is shown in FIG. 9. As apart from the disk, the other parts and their working mechanisms of this embodiment are same as those of the first embodiment, in order not to repeat same descriptions, only the disk used for this second embodiment of the apparatus is described underneath.

FIG. 10 illustrates the schematic optical structure of the single side data storage disk, which is used for the second preferred embodiment of the apparatus, and the beam paths in the data write status (the shown structure is not drawn in practical ratio). This disk has same shape and size as those of one used for the first preferred embodiment and may be mounted on the rotation spindle to become rotatable and removable or rotatable and not removable. In general, there is/are one or multiple (2 to 90 or even more) storage layers in the disk. In this embodiment, the disk has three storage layers. This disk comprises an highly reflective substrate, such as an aluminum substrate 282, two liquid crystal layers 284, 286, three transparent alignment layers 290, 292, 294, a transparent electrode layer 296, three optical storage medium layers 298, 300, 302, a cut-off filter or narrowband reflector layer 304, and a transparent cover layer 306. The grooves are etched, or stamped, or molded onto the top surface of the top storage layer 298 to form concentrically circular or spiral tracks. The optical storage medium layers are made of photorefractive, polarization and wavelength sensitive optical materials, and each storage layer is sensitive to a particular wavelength range. The aluminum substrate 282 is also used as the bottom electrode. The transparent electrode layer 296 is the top electrode, which is connected with a metal spindle 308 (see FIG. 9). The bottom electrode is connected with a conductive O-ring on the supporting tray 310. Then the spindle and the O-ring are connected with the controller 312. The reflective aluminum substrate may be replaced by a silver substrate, or replaced by polycarbonate, or a glass, or a plastic substrate with a conductive and reflective coating on top surface, which is also used as the bottom electrode. The refractive indexes of the cover layer, the cut-off filter or narrowband reflector layer, the storage layers, the top electrode layer, the alignment layers and the liquid crystal layers are chosen to make the light reflections at the interfaces between every two contact layers as small as possible, and so these light reflections may be neglected. In order to reduce these reflections, the measures introduced for the disk 119 may be adapted. The cover layer and the inserted dielectric layers may be made of polycarbonate, or glass, or transparent plastics and other optical materials.

A light controlling system is designed and embedded in the disk, which can act as a nonpolarizing broadband reflector and a nonpolarizing broadband absorber, and can be switched from one state to the other with fast speed. Thus, a switchable "mirror" can be switched on or off under the illuminating beams. This "mirror" consists of two liquid crystal cells comprising two liquid crystal layers 284, 286, three alignment layers 290, 292, 294 and two electrodes 282, 296. By choosing aligning directions of the alignment layers 290, 292 and 294, the directions of the liquid crystal directors in the layers 284 and 286 are all parallel with the disk plane, and the liquid crystal director directions in the layer 284 are perpendicular to those in the layer 286. In the data read or the data erase status using traveling waves, no voltage is applied between the top and bottom electrodes, so two orthogonal polarization components of the beam light reaching the liquid crystal layers are absorbed by two liquid crystal layers, respectively. Such absorption has high absorbability in wide wavelength range. Thus, the illumination beams become the traveling waves, they either are reflected by the created Bragg reflectors when their intensities are low, or eliminate the Bragg reflectors when their intensities are high. In the data write or the data erase status using standing waves, a voltage is applied between the top and bottom electrodes, the liquid crystal directors in the layers 284 and 286 are rotated parallel with the applied electric field. Thus, as the illumination beam polarization directions are all perpendicular to the liquid crystal directors, the beams will pass through the two liquid crystal layers without changes of their polarization directions. Then these beams are reflected back by the aluminum substrate 282 to form standing waves in the storage layers to create the Bragg reflectors, or to change the required Bragg reflectors into "no data" states. 228 and 230 are edge light rays of the adjustment beam for automatic focusing and tracking of the actuator 90. The layer 304 has same transmission wavelength rang as that of the layer 150. In order to increase the liquid crystal layer resistance to stress and to make its thickness uniform, some fillings need to be filled between three alignment layers, such as thin glass fibers. The liquid crystal cell structure may be changed basing on the existing optical knowledge. For examples, the middle alignment layer 292 may be replaced by a transparent polycarbonate, or glass, or plastic layer coated with electrode layers and alignment layers on both side surfaces to make the liquid crystal directors rotate more reliably and uniformly; or the two liquid crystal cells with alignment layers and electrodes are built outside and under the disk, and keeping this switchable "mirror" close to the disk, and so on. The multilayer structure on top side of the substrate 282 may be made on both sides of the substrate 282, to build double-side disk to double the storage capacity.

The above described embodiments of the apparatus may be modified further. The laser arrays 4 and 200 in FIG. 3 may be replaced by two or several multi-wavelength or frequency tunable lasers to simplify the apparatus structure. In that case, the apparatus structure including optical paths and elements, such as the intensity modulator(s), the optical isolator(s), the polarization rotator(s), the intensity detectors and so on, need to be changed to match the laser sources. For example, if using multi-wavelength lasers, their beams may be separated by a dispersion prism and travel along different paths. After the beam intensities and polarization directions are modulated and rotated separately, these beams are collected by another dispersion prism to become collinear, concentric and parallel or quasi-parallel beams and illuminate the disk. If using frequency tunable lasers, the related optical paths and elements are designed to work in the synchronous scanning manner with laser wavelength change, or partial apparatus works in the synchronous scanning manner, and the other partial works in the wavelength separated manner. In addition, if the beam number is large, the lasers may be arranged in several lines with increased intervals to let the beam isolating, splitting, rotating, detecting elements may be easily used. After modulated and rotated in groups separately, the beams in different lines are collected by different dispersive prisms first. Then the beams in different groups are collected by another prism to become collinear, parallel or quasi-parallel beams travel along one common optical axis. Because the designs for these structure changes may be made based on the key idea of the invented method and the existing optical knowledge, the detailed descriptions are neglected in order to save the page number of this "Description" document.

I claim:

1. An optical six-dimensional data storage method, the method comprising:

using multiple linearly polarized light beams with different wavelengths, encode intensities and encoded polarization directions, which correspond to each group of data according to a color shade and polarization direction encoding regulation, during each short period, to form each group of plane or quasi-plane standing waves in the photorefractive, polarization and wavelength sensitive optical medium;

and through interactions between the formed standing waves and the medium to change medium refractive index to create each group of multiple wavelength selective, reflectivity specified and polarization sensitive tiny plane or quasi-plane Bragg reflectors in a small volume of the medium as each storage cell;

and through wavelength sensitive character of the medium to locate the created Bragg reflectors in each storage cell in one layer storage medium or separately in multilayer storage medium;

later by illuminating required storage cells using multiple unpolarized light beams to produce the groups of the reflected beams with selected wavelengths, correspondent intensities and particular polarizations;

at last by decoding the groups of the reflected beams from the required storage cells through a color shade and polarization direction decoding process to reproduce the required stored data groups;

in addition, may use traveling waves with required wavelengths during required periods to eliminate the created Bragg reflectors in one or multiple storage medium layer(s) of one or multiple storage cell(s) to erase the partial or total stored data, or may use standing wave(s) with required wavelength(s) during required period(s) to make one or multiple Bragg reflector(s) have a specified reflectivity and polarization direction, which represents "no data", to erase the partial or total stored data.

2. The optical six-dimensional data storage method of claim 1, wherein said different wavelengths are in the visible region, or extend into the ultraviolet or/and infrared region(s).

3. The optical six-dimensional data storage method of claim 1, wherein said color shade and polarization direction encoding regulation is that a certain part or the whole of every one of all possible composite states of the wavelengths, intensities and polarization directions of said multiple linearly polarized beams is defined in advance to correspond with a particular basic symbol of a suitable digital encoding scheme, and every one of the required basic symbols may be represented by a certain part or the whole of a correspondent composite state, thus any data group, which data amount is adequate and limited, is represented by a said composite state by proper combination and arrangement of the correspondent basic symbols; and wherein said color shade and polarization direction decoding process is a reverse process of said color shade and polarization direction encoding.

4. The optical six-dimensional data storage method of claim 1, wherein said to form each group of plane or quasi-plane standing waves is that a refractive mirror is moved to or switched on under the outgoing beams from the storage medium to reflect the said multiple linearly polarized beams perpendicularly back into the storage medium to interfere with the subsequently incident beams.

5. The optical six-dimensional data storage method of claim 1, wherein said photorefractive, polarization and wavelength sensitive optical medium is the materials which optical refractive index may be changed by light with the intensity of over the change threshold of medium refractive index, and these material refractive indexes change also with light polarization direction and wavelength or with polarization direction, these materials include photoaddressable polymers, polarized holographic recording photopolymers, metallic nanorods, semiconductor nanocrystal quantum dots, and so on.

6. The optical six-dimensional data storage method of claim 1, wherein said using multiple unpolarized light beams to produce the groups of the reflected beams and wherein said traveling waves is that the reflective mirror under the beams outgoing from the storage medium is removed or switched off, so the illumination beams become the travelling waves in the storage medium, and are only reflected by the created Bragg reflectors.

7. The optical six-dimensional data storage method of claim 1, wherein said a specified reflectivity and polarization direction, which represents "no data", means that the Bragg reflectors created by the beams with a specified reflectivity level and a specified polarization direction with any wavelength are all predetermined to represent no data in said color shade and polarization direction encoding and decoding regulations.

8. The optical storage apparatus designed based on the optical six-dimensional data storage method of claim 1, the apparatus comprising:

one layer or multilayer photorefractive, polarization and wavelength sensitive optical storage medium with data stored in concentrically circular or spiral tracks;

lasers generating multiple linearly polarized or unpolarized beams with different wavelengths, these multiple linearly polarized or unpolarized beams are arranged to be collinear, concentric and focused or quasi-parallel with available smallest diameters to write data to, read data from and erase data in the said storage cells;

one or multiple light intensity modulator(s), one or multiple polarization direction rotator(s) and one electronic processor to encode the composite state of wavelengths, intensities and polarization directions of said multiple linearly polarized beams during each short period to correspond to each group of data according to said color shade and polarization direction encoding regulation;

an optical means for making the available smallest diameters of said multiple linearly polarized or unpolarized beams at one or different depth(s) according to their wavelengths;

multiple optical detectors for measuring the intensities and polarization directions of the beams reflected from each required said storage cell, and an electronic processor for decoding the composite state of wavelengths, intensities and polarization directions of the beams reflected from each required said storage cell during each required short period to reproduce each required group of data according to said color shade and polarization direction decoding regulation;

an optical means for fast moving or switching on a reflective mirror under the beams outgoing from said one layer or multilayer optical storage medium when writing the data or erasing the data using the standing waves, and removing or switching off that mirror when reading the data or erasing the data using the traveling waves;

an optical means for automatic making the available smallest diameters of said multiple linearly polarized or unpolarized beams fall in the required layer(s) of the one layer or multilayer optical storage medium according to their wavelengths;

an optical means for automatic tracking to center the multiple linearly polarized or unpolarized light beam spots on said circular or spiral tracks;

in addition, an optical means may be used if needed for correcting reflectivity distortions of the Bragg reflectors in different storage cells in the disk;

an optical means may be used if needed for correcting reflectivity ununiformity of the Bragg reflectors created by the beams with different wavelengths in one or different disks;

and an optical means may be used if needed for making the apparatus to be compatible with the CD and DVD disks.

9. The optical storage apparatus of claim 8, wherein said one layer or multilayer optical storage medium is made in a rotatable and removable or non-removable optical disk which generally has a round plate shape with diameter of 5 mm to 2000 mm and thickness of 0.1 mm to 20 mm, including the shape and size same as those of the CD and DVD disks, the thickness of each storage medium layer is from 0.3 μm to 3 mm.

10. The optical disk of claim 9, which comprises a transparent substrate, one or multiple (2 to 90 or even more) optical storage medium layer(s), two cut-off filter or narrowband reflector layers, two transparent cover layers and the grooves which form the concentrically circular or spiral tracks, the transparent substrate and two cover layers are made of polycarbonate, or glass, or other transparent plastics and optical materials.

11. The optical disk of claim 9, which comprises a highly reflective substrate, two liquid crystal layers with alignment layers and electrode layers, one or multiple (2 to 90 or even more) optical storage medium layer(s), a cut-off filter or narrowband reflector layer, one cover layer and the grooves which form the concentrically circular or spiral tracks, the highly reflective substrate is made of aluminum or silver, or is polycarbonate or glass or plastic substrate with reflective coating, the cover layer is made of polycarbonate or glass or transparent plastic and other optical material; above said two liquid crystal layers with alignment layers and electrode layers, above said one or multiple optical storage medium layer(s), above said a cut-off filter or narrowband reflector layer, above said one cover layer and above said grooves may also be made on another side of said highly reflective substrate to form a double-side disk.

12. The optical storage apparatus of claim 8, wherein said lasers generating multiple linearly polarized beams are one or several laser array(s), each of them consists of 2 to 90 or even more semiconductor lasers arranged in a line according to their wavelength order, or one or several multi-wavelength or frequency tunable lasers; wherein said lasers generating multiple unpolarized beams are two or even number laser arrays, each laser array consists of 2 to 90 or even more semiconductor lasers arranged in a line according to their wavelength order and every two laser arrays have same laser number and wavelengths, or are two or several (even number) multi-wavelength or frequency tunable lasers, and the polarization directions of these multi-wavelength lasers, frequency tunable lasers and laser arrays are all arranged with the result that there are always two orthogonal linearly polarized beams with a same wavelength during each short period when reading data.

13. The optical storage apparatus of claim 8, wherein said optical means for fast rotating the polarization directions of said multiple linearly polarized beams is that using tunable liquid crystal or electro-optic crystal polarization rotator or rotator array(s) to rotate the polarization directions of said multiple linearly polarized beams in the synchronously scanning manner with wavelength change when using frequency tunable or multi-wavelength laser(s), or in the wavelength separated manner when using laser array(s) or multi-wavelength laser(s).

14. The optical storage apparatus of claim 8, wherein said optical means for making beams in different sub-groups become parallel or quasi-parallel beams with available smallest diameters at different depths, and the beams in each sub-group only interact with a correspondent layer of storage medium is that using multiple cut-off reflectors with different transmission wavelength ranges to separate said multiple linearly polarized or unpolarized beams into multiple sub-groups with different wavelength ranges, and using multiple pairs of convergent and divergent lenses to make these beam sub-groups have available smallest diameters and at different depths; or using a convergent and a divergent lenses, one or both of them is/are made of axially chromatic difference material, to make these beam sub-groups have available smallest diameters and at different depths; and by choosing the material structures to make each storage medium layer sensitive to one wavelength range to let each beam sub-group only interacts with correspondent layer of storage medium.

15. The optical storage apparatus of claim 8, wherein said optical means for fast moving or switching on, and removing or switching off a reflective mirror under the beams outgoing from said one layer or multilayer optical storage medium is that moving or removing a small reflective mirror under or from the beams by a voice coil motor, and when the small mirror is under the beams, keeping the mirror close to the disk by automatic focusing of an actuator on which the small mirror is mounted; or using two switchable liquid crystal cells, which are built in or outside the disk, with a highly reflective substrate or reflective mirror to form a nonpolarizing broadband reflector and absorber under the storage medium, with turning on or off the voltage applied on the liquid crystal cells, to rotate the orientations of the liquid crystal directors in two cells to be parallel with or perpendicular to the applied electric field, to make the beams pass through the two liquid crystal cells and be reflected back from the reflective substrate or mirror, or be absorbed in two liquid crystal cells.

16. The optical storage apparatus of claim 8, wherein said optical means for automatic making the available smallest diameters of said multiple linearly polarized or unpolarized beam sub-groups fall in the required layer(s) of the one layer or multilayer optical storage medium is that an additional beam is used as adjustment beam, this adjustment beam and the said multiple linearly polarized or unpolarized beams are arranged to be collinear and concentric, and the adjustment beam focus and the smallest diameters of said multiple linearly polarized or unpolarized beam sub-groups are arranged at different depths and with fixed intervals, the adjustment beam focus is kept on the groove surface by automatic focusing.

17. The optical storage apparatus of claim 8, wherein said optical means for automatic tracking is that the said adjustment beam for automatic focusing is used as the tracking adjustment beam too, this adjustment beam and the said multiple linearly polarized or unpolarized beams are arranged to be collinear and concentric, the adjustment beam focus is kept on the desired groove by automatic tracking.

18. The optical storage apparatus of claim 8, wherein said optical means for correcting reflectivity distortions of the Bragg reflectors in different storage cells in the disk is that using one beam, which has a specified wavelength, a specified polarization direction and an allowable highest intensity, to create a special "referring" Bragg reflector in every storage cell of the disk or in partial storage cells which are distributed uniformly in the disk with suitable density, then regarding the highest received intensity from every storage cell or from the storage cells containing the "referring" Bragg reflector as the intensity value of "1", and determining each of the other received intensities from every same storage cell or from the storage cells in the vicinity of the cell containing "referring" Bragg reflector according to the intensity ratio of each other received intensity to the highest one.

19. The optical storage apparatus of claim 8, wherein said optical means for correcting reflectivity ununiformity of the Bragg reflectors created by the beams with different wavelengths in one or different disks is that using a special beam group with all write wavelengths to create a "referring" storage cell in every disk, every beam in this special beam group has a same specified polarization direction and a same allowed highest intensity, then measuring the intensities and wavelengths of the beams reflected from this "referring" storage cell, regarding the highest received intensity value as "1", then the reflectivity decline ratio of every beam with different wavelength may be determined by comparing that received intensity with the highest received one, then by dividing the other received intensities by these decline ratios according to their wavelengths to correct the spectral response influences of the received beam intensities.

20. The optical storage apparatus of claim 8, wherein said an optical means for making the apparatus to be compatible with the CD and DVD disks is that using the said adjustment beam for automatic focusing and automatic tracking also as the write, read and erase beams for CD or DVD disks, when the received adjustment beam light energy is higher or lower than a certain value, then the received light is represented as "1" or "0".

* * * * *